(12) United States Patent
Boyd et al.

(10) Patent No.: US 6,208,908 B1
(45) Date of Patent: Mar. 27, 2001

(54) INTEGRATED ORDER SELECTION AND DISTRIBUTION SYSTEM

(75) Inventors: Brad J. Boyd, Allentown; Donald R. Grunwald, Bethlehem; David Galloway, Kintnersville; James Werkheiser; David A. Clark, both of Nazareth, all of PA (US)

(73) Assignee: SI Handling Systems, Inc., Easton, PA (US)

( * ) Notice: Subject to any disclaimer, the term of this patent is extended or adjusted under 35 U.S.C. 154(b) by 0 days.

(21) Appl. No.: 09/300,069

(22) Filed: Apr. 27, 1999

(51) Int. Cl.⁷ ........................................ G06F 7/00
(52) U.S. Cl. .................. 700/216; 700/225; 700/226; 198/349; 198/349.95; 198/370.04; 198/370.05; 198/704; 414/268; 414/273
(58) Field of Search ........................... 700/213, 214, 700/216, 225, 226; 198/349, 349.95, 370.04, 370.05, 704; 414/268, 269, 270, 273

(56) References Cited

U.S. PATENT DOCUMENTS

| | | | |
|---|---|---|---|
| 2,740,515 | 4/1956 | Wilson | 198/19 |
| 3,848,728 | 11/1974 | Leibrick et al. | 198/155 |
| 4,209,898 | 7/1980 | Aoki et al. | 29/783 |
| 4,501,528 | 2/1985 | Knapp | 414/273 |
| 4,542,808 | * 9/1985 | Lloyd, Jr. et al. | 186/56 |
| 4,870,799 | * 10/1989 | Bergerioux et al. | 364/478 |
| 4,921,087 | * 5/1990 | Nakamura | 198/350 |
| 5,271,703 | 12/1993 | Lindqvist et al. | 414/268 |
| 5,533,606 | * 7/1996 | Yuyama | 198/349 |
| 5,672,039 | * 9/1997 | Perry et al. | 414/280 |
| 5,706,928 | * 1/1998 | Neukam | 198/349 |
| 5,720,157 | 2/1998 | Ross | 53/445 |
| 5,943,841 | * 8/1999 | Wunscher | 53/154 |

* cited by examiner

Primary Examiner—Christopher P. Ellis
Assistant Examiner—Khoi H. Tran
(74) Attorney, Agent, or Firm—Seidel, Gonda, Lavorgna & Monaco, PC

(57) ABSTRACT

An integrated order selection and distribution system is provided for selecting and delivering a plurality of articles associated with a preselected customer order. The system includes discrete article receptacles, a conveyor, and a plurality of pack stations. The receptacles releasably retain articles associated with a preselected customer order. Each receptacle is transported to predetermined locations within the system by the conveyor. The pack stations are arranged along the direction of movement of the conveyor to receive the articles to be discharged from the receptacles. A system controller tracks the location of the receptacles in the system and generates a signal that causes each receptacle to discharge its articles at a predetermined location, relative to the pack stations. In the preferred embodiment, the system controller assigns each receptacle to at least one of the pack stations in round-robin fashion based upon the type of articles to be discharged.

26 Claims, 18 Drawing Sheets

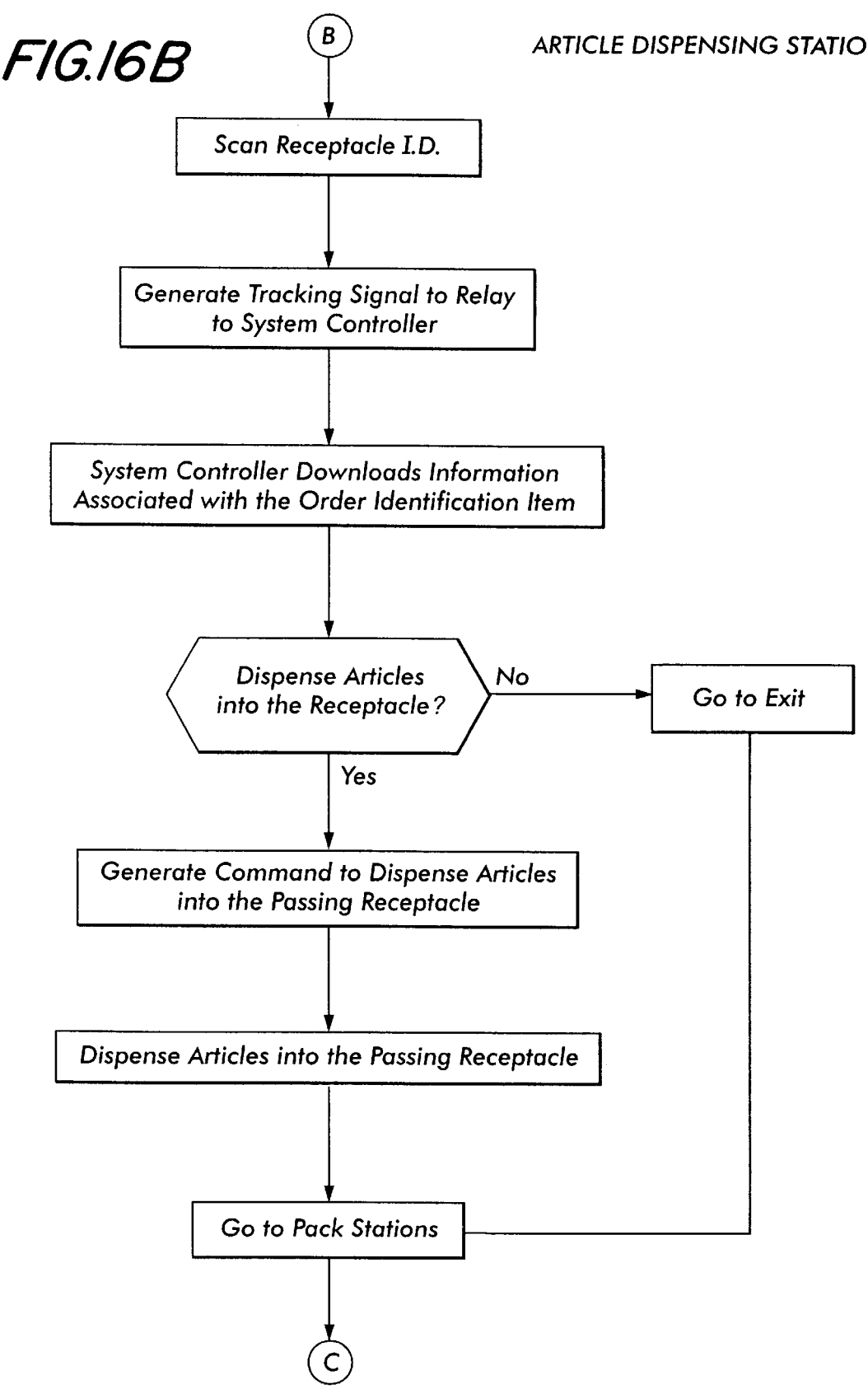

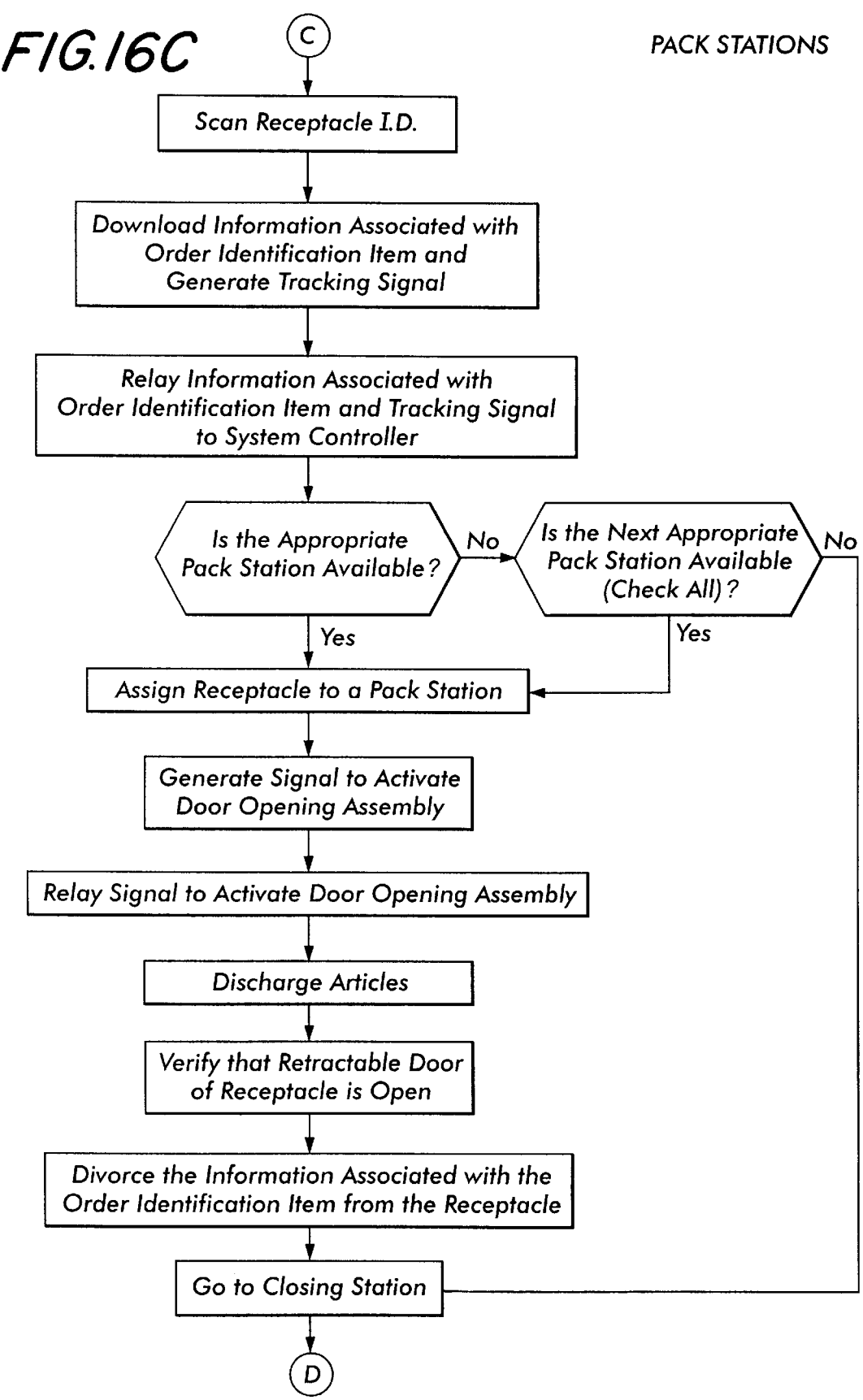

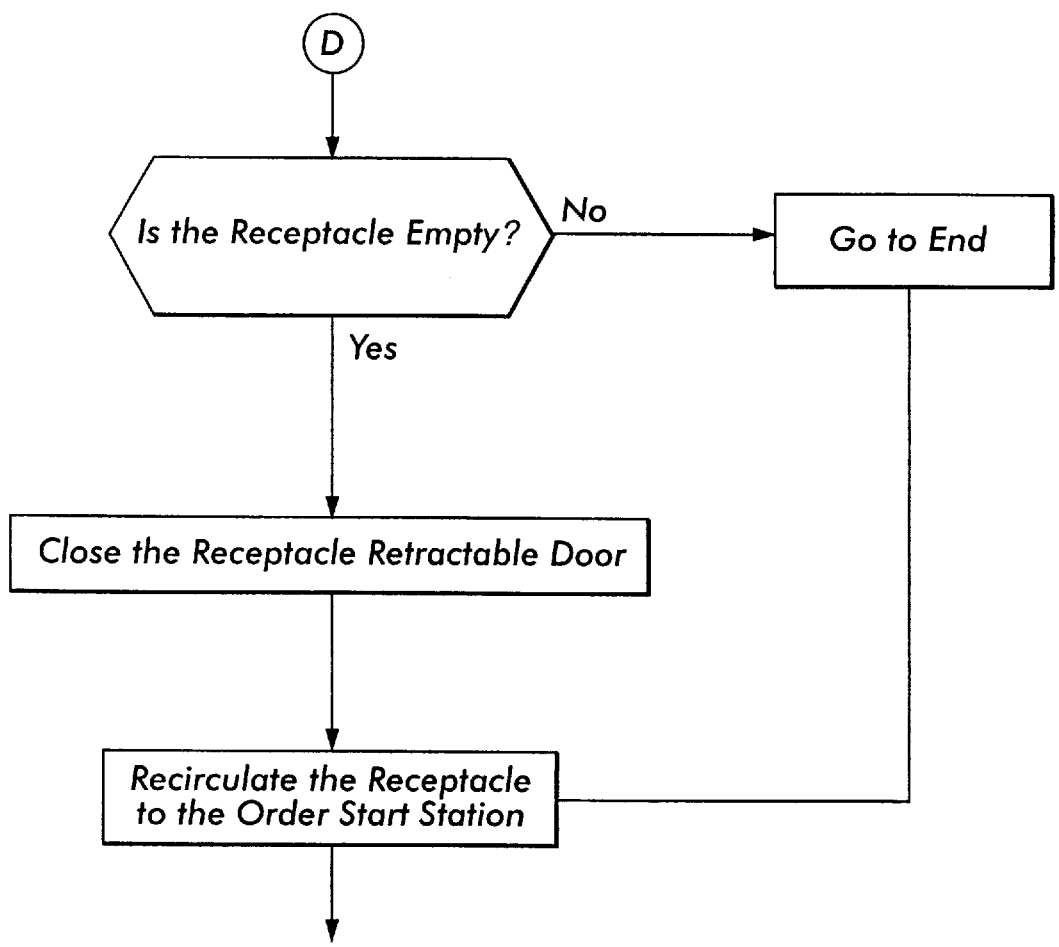

INTEGRATED ORDER SELECTION AND DISTRIBUTION SYSTEM

FIELD OF THE INVENTION

The present invention relates to an integrated system for selecting articles associated with a preselected customer order and for delivering the articles to a predetermined location for packing.

BACKGROUND OF THE INVENTION

Order selection and distribution systems often are part of material handling systems within warehouses. Order selection and distribution is the selective retrieval and packing of appropriate numbers and types of articles from a storage area to fill specific customer orders. Customer orders are received by warehouses in various forms such as through the mail, over the telephone, through the Internet, and the like. Once received by the warehouse, orders are usually represented by a list of stock keeping units (SKUs) or line items. The list specifies the type and quantity of each unit or article to be retrieved, along with other information such as the storage location, the scheduled picking period, the due date, the customer name and address, etc. To fill each customer order, material handling subsystems have been developed to select, retrieve, transport, check, pack, and ship articles associated with a selected order.

The selection and distribution capabilities of such material handling subsystems must keep up with demand for the ever-increasing variety of articles being made available to consumers. This ever-increasing demand is being encountered for articles such as pharmaceutical products, cosmetics, health and beauty aids, contact lenses, photographic films, automotive equipment, compact discs, audio and video cassettes, books, and many other consumer products. To keep up with this demand, warehouse material handling subsystems have been automated and, more particularly, are controlled by various computerized systems. For example, some material handling subsystems utilize automated picking stations that retrieve articles from designated storage locations and deposit the articles on a moving belt in groups corresponding to discrete orders. Systems of this type are concerned with grouping articles associated with the discrete orders, rather than putting the articles into a preselected sequence for packing.

Other systems pick and sort the articles into separate orders for delivery to the customer. Such systems have used individual trays to collect the articles associated with a particular order. The trays are designed to travel on a conveyor until they reach a designated unloading or packing location. Upon reaching the unloading location, the trays are removed from the conveyor so that the articles in the trays may be packed for delivery. Removing the trays and the articles is usually done manually, but in some cases is done by mechanical devices. Some of the mechanical devices tilt the trays so that the articles may slide or fall onto a work area for packing. Tilting the trays has proven to be only marginally effective because more often than not some of the articles remain in the tray after the tray has been tilted. The articles which remain must then be removed manually, which delays packing the order and increases the costs associated with the selection and distribution process.

Prior to the present invention, material handling subsystems for filling, sorting, and packaging orders have been maintained separately. Maintaining separate subsystems has required manufacturers to dedicate a significant amount of warehouse floor space for each subsystem. In addition, maintaining separate subsystems often results in higher costs associated with selecting and distributing articles for customer orders. The higher costs are ultimately passed on to the customer in the form of higher prices per article.

Accordingly, the present invention is directed to an integrated order selection and distribution system which streamlines the overall selection and distribution process of articles for a customer order.

SUMMARY OF THE INVENTION

The present invention is directed to an order selection and distribution system for selecting and delivering a plurality of articles associated with a preselected customer order to a packing area. The system comprises a discrete article receptacle, a conveyor, an order identification item, a pack station, an actuator associated with the pack station, and a system controller.

The receptacle releasably retains articles to be delivered. The receptacle includes an interior space for receiving the articles and a discharge opening for discharging the articles. The receptacle is transported to predetermined locations within the system by the conveyor.

The order identification item is associated with the receptacle to assign the receptacle to carry specified articles associated with a preselected order. The articles are delivered in the receptacle to the pack station, which is arranged along a direction of movement of the conveyor. The pack station receives the articles to be discharged from the receptacle. The actuator is associated with the pack station for selectably engaging the receptacle to cause the articles in the interior space to be discharged through the discharge opening.

The system controller tracks the location of the receptacle in the system, and generates a discharge signal to cause the actuator to engage the receptacle when the receptacle is at a predetermined discharge location in the system, relative to the pack station.

In the preferred embodiment, the system comprises a plurality of article receptacles, an inserter, an article dispenser, and a plurality of pack stations. Each receptacle includes a movable discharge member that controls the discharge of the articles through the discharge opening. The inserter is used to insert an order identification item into one of the receptacles to assign the receptacle to a preselected customer order. The article dispenser will dispense one or more articles into the receptacle based upon the information associated with the order identification item. Thereafter, the system controller assigns one or more of the receptacles to at least one of the pack stations in round-robin fashion based upon the type of article to be dispensed into the receptacle.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
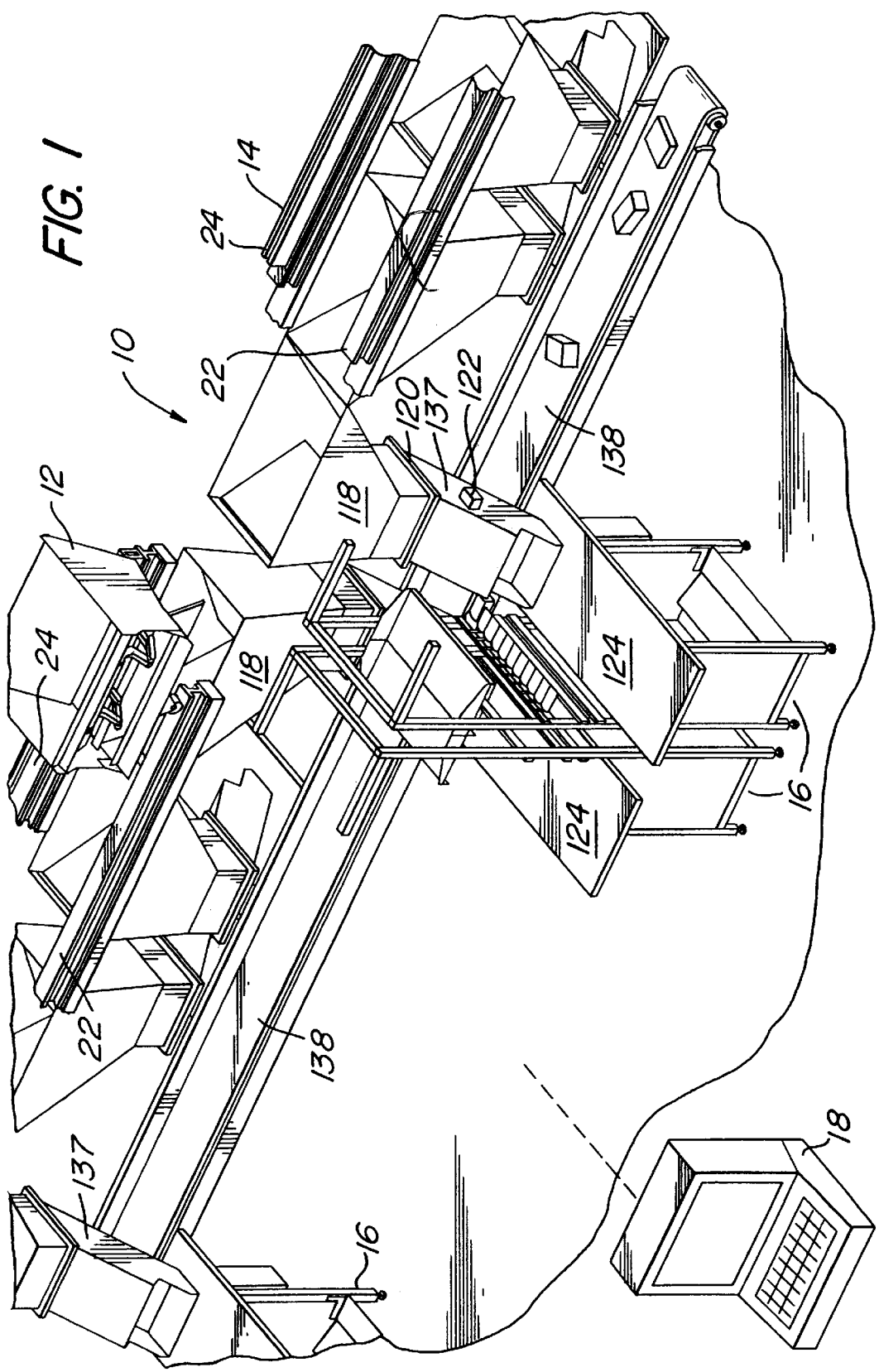
FIG. 1 is a perspective view showing a portion of the order selection and distribution system according to the invention.

Referring to the drawings, wherein like numerals indicate like elements, there is shown in FIG. 1 a portion of the preferred embodiment of an order selection and distribution system 10 according to the present invention. The system 10 comprises one or a plurality of discrete article receptacles or containers 12 (one shown), a conveyor system 14, and a plurality of pack stations 16 arranged along a direction of movement of the conveyor system 14. In FIG. 1, two pack stations 16 are illustrated. However, as indicated below variations of the system 10 may have any number of pack stations 16, including just one pack station 16.

The system 10 is controlled in part by a system controller 18 that, among other things, tracks the location of the receptacles 12 that move through the system 10. The system controller 18 includes microprocessors, data entry, storage, and retrieval devices, and other data processing equipment to interface with the various components and subsystems of the system 10, such as the pack stations 16.

The Conveyor System

The conveyor system 14 comprises a track 20 that transports the receptacles 12 through the system 10. The track 20 includes a rail 22 and a continuous loop chain conveyor 24, spaced apart from each other. The rail 22 is an I-beam and supports least one side of the receptacle 12. The opposite side of the receptacle 12 is supported by the chain conveyor 24. The chain conveyor 24 is disposed within a U-shaped track and tows the receptacle 12 through the system 10. The spacing between rail 22 and chain conveyor 24 may, but need not, correspond to the width of the receptacle 12.

Other means for transporting the receptacles 12 may be used in keeping with the present invention. As a few examples, belt conveyors, overhead conveyors, stranded conveyors, lifts, monorails, in-floor towline conveyors, and other types of carriers known in the material handling art may be adapted for use with the present invention. Naturally, the type of transporting means chosen will most likely, but not necessarily, determine the appearance and structure of the receptacles 12.

The Receptacle

Figure 2:
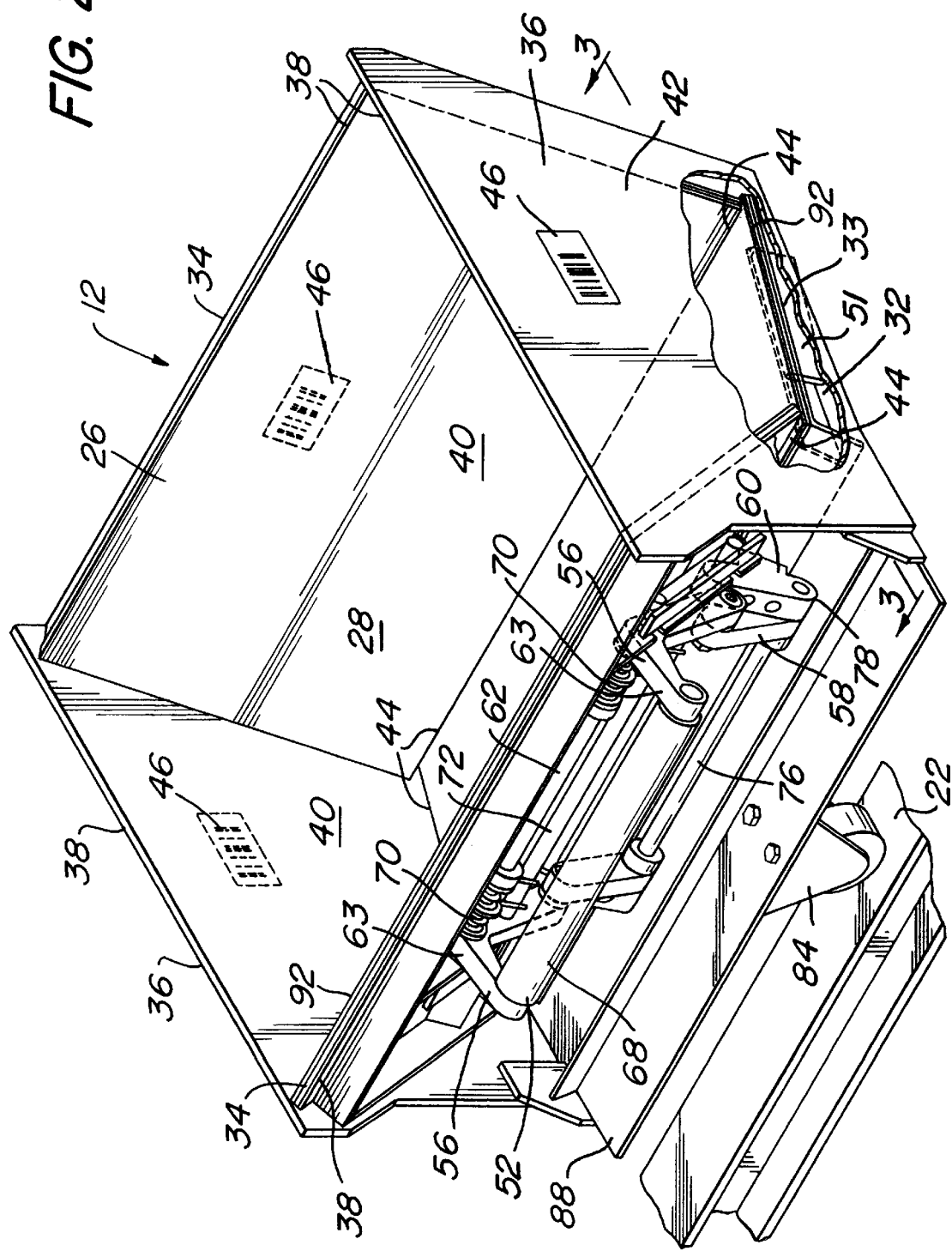
FIG. 2 is a perspective view of a discrete article receptacle used in the system according to the invention, having a discharge member shown in a retracted/closed position.
Figure 3:
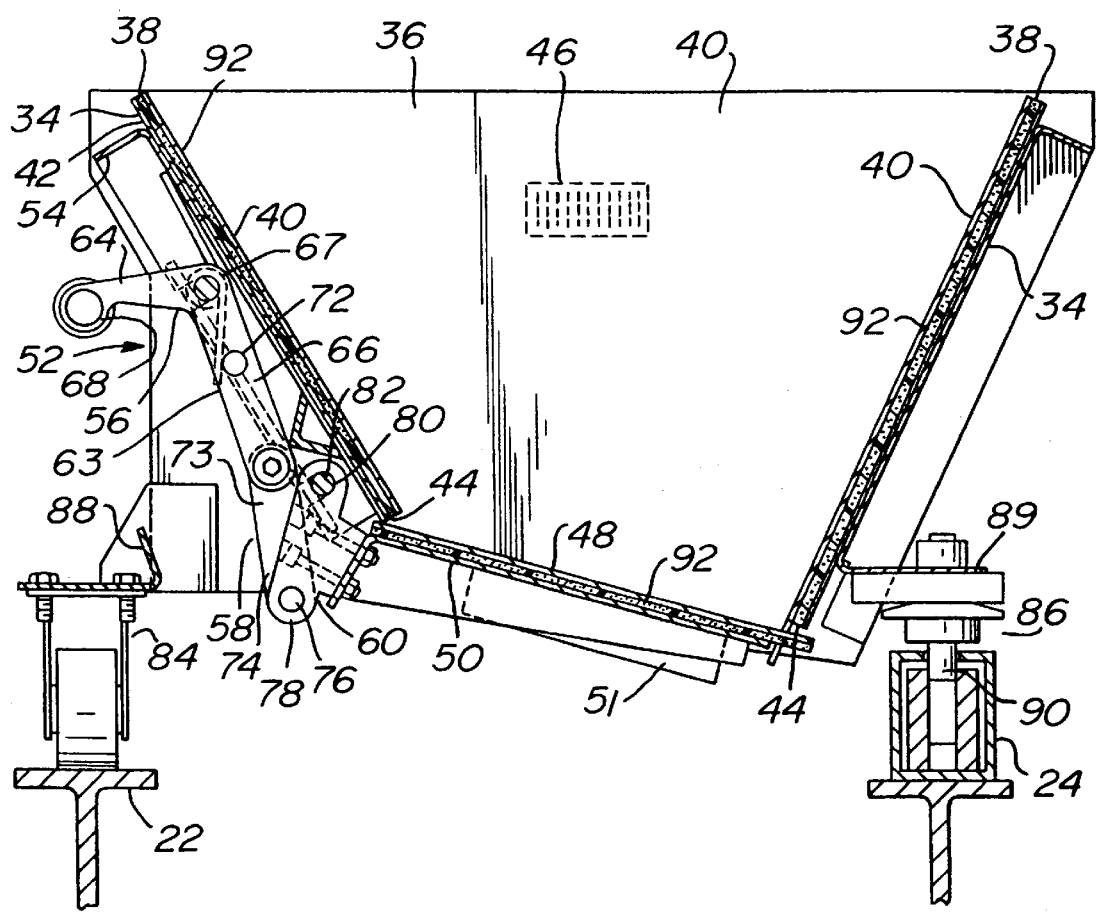
FIG. 3 is a rear sectional view of the receptacle shown in FIG. 2, taken along line 3—3 of FIG. 2.

Referring to FIGS. 2 and 3, the receptacle 12 as presently contemplated is shown, it being understood that either one or a plurality of receptacles 12 may be used. The receptacle 12 is used to transport through the system 10 articles associated with a preselected customer order. The receptacle 12 has an open top 26, an interior space or receiving area 28 for receiving the articles, a discharge opening 30 (not shown), and a discharge member 32 or article retainer. Articles are received in the interior space 28 through the open top 26. The interior space 28 is formed by a pair of side walls 34 and a pair of end walls 36 joined in conventional fashion using known techniques. Walls 34 and 36 may be made of any material, such as plastic, wood, metal, or the like. Each wall 34, 36 includes a peripheral top edge 38, an inner surface 40, an outer surface 42, and a bottom edge 44. The side and end walls 34, 36 may, if desired, be replaced by a continuous wall constructed in much the same way as the preferred embodiment illustrated in FIG. 2.

Indicia 46 are attached to at least one wall to facilitate identifying the receptacle 12 as it moves through the system 10. The indicia 46 shown in phantom are representative of the indicia 46 on the outer surface 42. The indicia 46 may be any form of human or optically readable label (bearing numerals, symbols, bar coded indicia, or the like) that is unique to each receptacle 12 in the same way as a "license plate" is unique to a motor vehicle. In the illustrated embodiment, the indicia 46 include bar coded indicia that can be scanned to identify the receptacle 12. Preferably, the indicia 46 are positioned on the outer surface 42 of at least one of walls 34 or 36 for ease in identifying the receptacle 12.

The discharge member 32 or article retainer retains the articles in the interior space 28 and controls the release and discharge of the articles through the discharge opening 30. In the illustrated embodiment of FIGS. 2–4, the discharge member 32 is a retractable floor or door 33 that is operatively connected to wall 34 to releasably retain the articles in the interior space 28. The retractable door 33 is positioned underneath a portion of walls 34, 36 near the location of the discharge opening 30. The retractable door 33 has a top surface 48 positioned below the interior space 28 and a bottom 50 from which a wear member 51 extends downwardly. A portion of the top surface 48 fits underneath a portion of the bottom edge 44 of side walls 34.

The retractable door 33 is moveably attached to the receptacle 12 to enable it to move between a retracted/closed position (as shown in FIG. 2) and a discharge/open position.

In the closed position, the retractable door 33 retains the articles in the interior space 28 such that the receptacle 12 operates in much the same way as a container having an open top and a fixed closed bottom to transport the articles through the system 10. Other means to retain the articles in the interior space 28, such as a slidable or pivotably attached floor or other moveable member associated with the receptacle 12, may be used. Preferably, the retractable door 33 is pivotably attached to side wall 34 and is adapted to rotate from the retracted/closed position to the discharge/open position.

The movement of the retractable door 33 is controlled by a door operator 52, such as a control mechanism, associated with the receptacle 12. The door operator 52 is preferably, but not necessarily, located next to the outer surface 42 of one of the side walls 34, surrounded in part by a support rim 54. The door operator 52 comprises a drive assembly or mechanism that is operatively connected to the retractable door 33. The drive assembly is in the form of a linkage having an input link 56, a coupler 58, and an output link 60. The input link 56 includes a pair of inverted L-shaped levers 63 each pivotably attached to opposite ends of a first pivot rod 62.

As shown in FIGS. 2 and 3, each lever 63 has an upper end 64 and a lower end 66 joined by an elbow 67. The upper end 64 of the lever 63 projects outwardly and is used to support a trip rod 68 attached thereto. The elbow 67 is pivotably attached to the first pivot rod 62, adjacent a pair of torsion springs 70, so that the lever 63 may rotate both clockwise and counterclockwise. The torsion springs 70 have one end biased against the outer surface 42 of side wall 34 and an opposite end biased against a shaft 72 that extends intermediate the two levers 63. Because each side of the linkage mirrors the other, only one side of the remaining components of the linkage will be hereinafter described as being representative of both.

The lower end 66 of lever 63 is pivotably attached to a first end 73 of the coupler 58. The first end 73 of the coupler 58 is aligned along a common axis with a second end 74 that is pivotably joined to the output link 60 by a second pivot rod 76. The output link 60 is T-shaped, and has a first end 78 pivotably joined to the second pivot rod 76 and a second end 80 pivotably joined to a third pivot rod 82 secured to the receptacle 12 in the same manner as the first pivot rod 62. The output link 60 is releasably secured to the retractable door 33 using a pair of bolts.

As depicted in FIG. 3, the receptacle 12 is laterally supported by a caster 84 on one side and a pendant 86 on the opposite side. The caster 84 is secured to a support bracket 88 that extends from the lower portion of the receptacle 12. The caster 84 includes a wheel adapted to travel on rail 22.

On the other side if the receptacle 12, the pendant 86 is supported by a mount 89 that extends from the lower portion of side wall 34. The pendant 86 includes a guide or tow pin 90 that is releasably secured to the chain conveyor 24 disposed within the U-shaped track so that the system conveyor 14 can transport the receptacle 12 through the system 10.

It should be understood that any number of casters 84 or pendants 86 may be used. If desired, the caster 84 and the pendant 86 may be replaced by other parts and devices that are adapted for use with the particular conveyor system 14 chosen for the system 10. In the preferred embodiment, at least two pendants 86 are aligned along a common axis to support one side of the receptacle 12.

To absorb some of the impact from the articles received in the interior space 28, a liner 92 may be secured to the inner surface 40 of walls 34, 36 and the retractable door 33. The liner 92 may be made of soft plastic, rubber, or any other type of soft material to prevent damage to the packaging, the contents of the articles, and the receptacle 12. The liner 92 is optional and may be omitted if desired.

The relative size, shape, and relationship between and among walls 34, 36 and the retractable door 33 are illustrated in FIG. 3. As shown, the side walls 34 are appropriately spaced apart from one another, each disposed in separate planes angled relative to each other and the vertical. The angle of each side wall 34 forms a channel to control the discharge of the articles from the interior space 28 through the discharge opening 30. The angle of each side wall 34 may be the same or different. In an alternative embodiment, the side walls 34 may be substantially vertical relative to each other.

The length of each side wall 34 may also be advantageously used to control the orientation of the retractable door 33. As shown in FIG. 3, the side wall 34 on the right is longer than the side wall 34 on the left. The difference between the respective lengths of each side wall 34 controls the orientation of the retractable door 33, which slopes downwardly from the left side to the right, as shown in FIG. 3. The particular lengths and orientation of the side walls 34 and retractable door 33 can vary as may be necessary to accommodate a particular installation.

In operation, the door operator 52 causes the retractable door 33 to move from the retracted/closed position to the discharge/open position. In the closed position shown in FIG. 3, the trip rod 68 extends outwardly from side wall 34 so that the linkage may be activated externally. To activate the linkage, the trip rod 68 is moved upwardly toward the top of the receptacle 12. As the trip rod 68 is moved upwardly, the upper 64 and lower 66 ends of the lever 63 will rotate clockwise relative to the first pivot rod 62. As the lower end 66 rotates, it takes with it the first end 72 of the coupler 58, pulling it outwardly.

As the first end 72 of the coupler 58 continues to be pulled outwardly, it will reach a point at which its second end 74 begins to pull the second pivot rod 76 outwardly. As the second pivot rod 76 is pulled outwardly, it will take with it the first end 78 of the output link 60, thereby causing the retractable door 33 to rotate clockwise relative to the second end 80. The retractable door 33 will continue to rotate until it reaches the open position to expose the discharge opening 30, as shown in FIG. 4.

Figure 4:
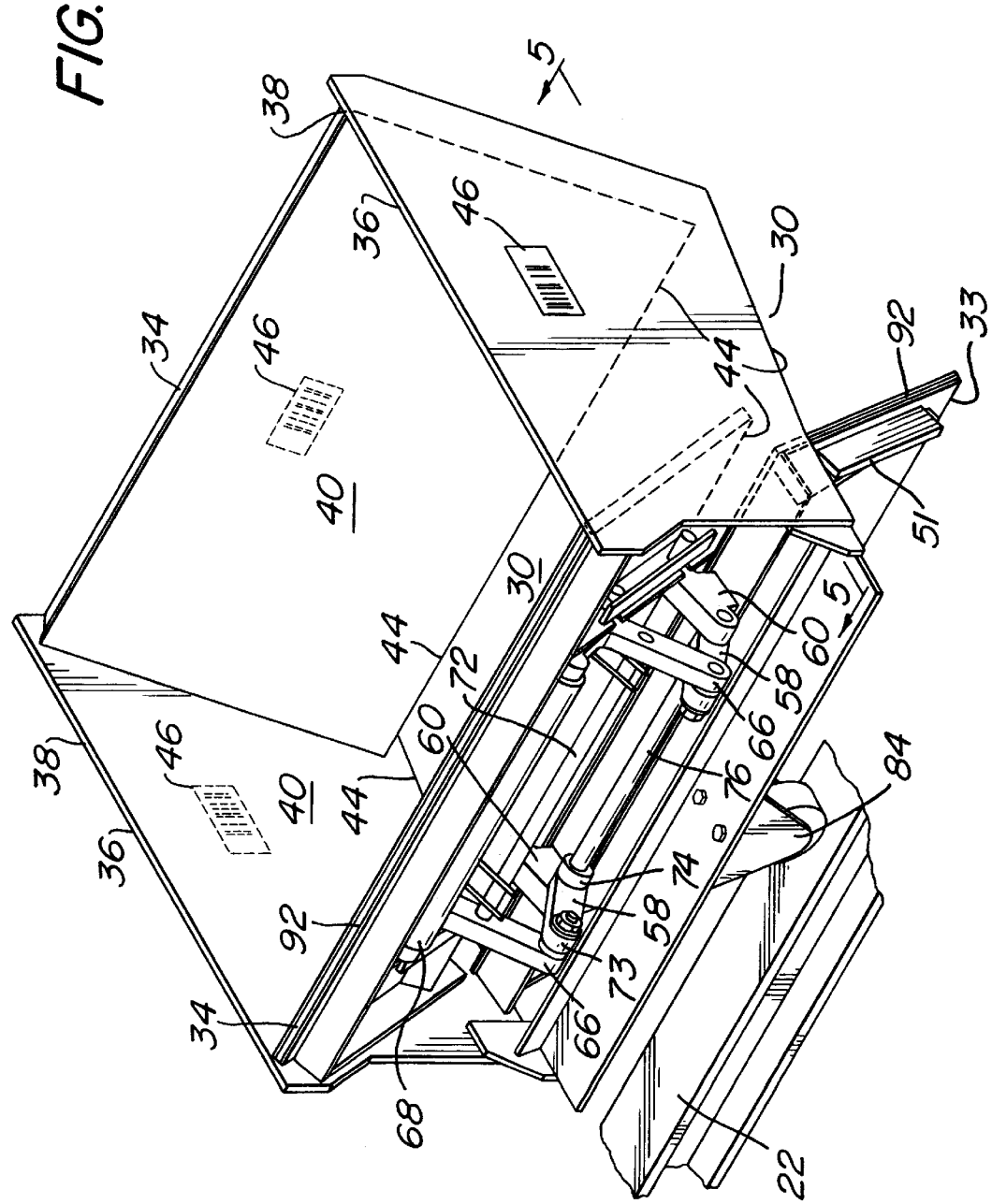
FIG. 4 is a perspective view of the receptacle shown in FIG. 2, with the discharge member shown in a discharge/open position.
Figure 5:
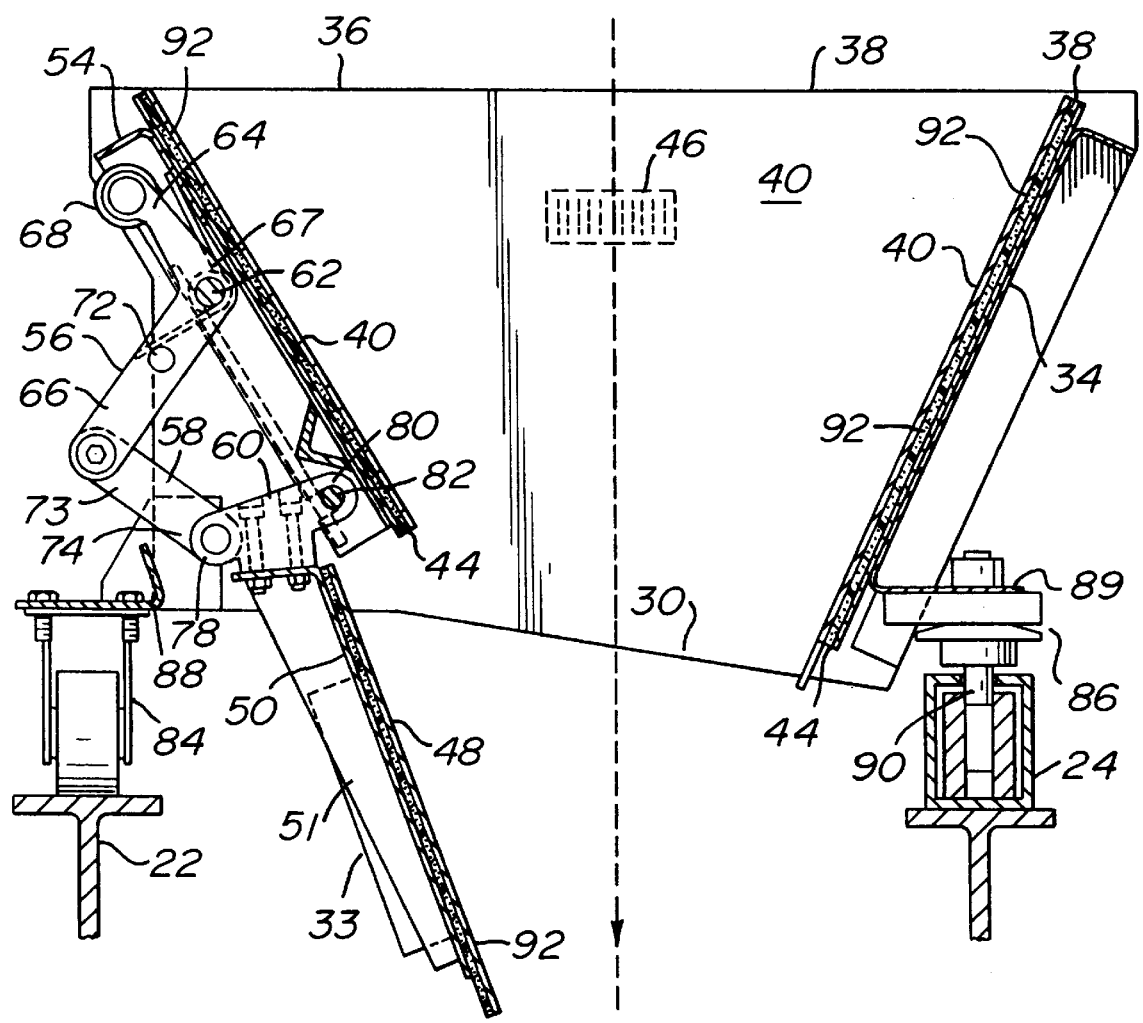
FIG. 5 is a rear sectional view of the receptacle shown in FIG. 4, taken along line 5—5 of FIG. 4.

As best seen in FIGS. 4 and 5, the discharge opening 30 is a hole or opening in receptacle 12 through which the articles in the interior space 28 may be discharged. In the embodiment shown, the discharge opening 30 is provided at the bottom of the receptacle 12 and is in communication with the interior space 28 generally defined by the position of side walls 34. As explained previously, the side walls 34 form a channel through which the articles are discharged through the discharge opening 30 along a central axis shown by the broken vertical line. In addition, as the articles are being discharged through the discharge opening 30, the retractable door 33 in the open position may be advantageously used to ensure that the discharging articles fall generally along the central axis. For example, the articles that are discharged from the discharge opening 30 may be deflected by the retractable door 33 toward the central axis. Alternatively, the location and dimension of the output link 60 and the retractable door 33 may be manipulated such that the top surface of the retractable door 33 is substantially flush with the side wall 34 on the left.

Although only one receptacle 12 is shown in the drawings, it should be understood that the invention is not limited to any particular number of receptacles 12 that may be used at any given time. For instance, one, two, or even more receptacles 12 may be used to transport articles that are associated with a single preselected customer order. In that way, large orders may be spread between and among a plurality of different receptacles 12. Thus, the present invention provides flexibility within which the receptacles 12 may be used to meet customer order demands. It will be also appreciated that the receptacles 12 may have a variety of shapes and sizes, depending upon the types of articles to be placed therein. A tote, bucket, or other type of discrete article container for collecting the articles may also be used in a manner similar to the receptacle 12 disclosed herein. Also, the receptacle 12 may have any configuration so long as there is a space for receiving and transporting the articles deposited therein.

Furthermore, it should be understood that the door operator 52 or door control mechanism can be replaced with any type of alternative linkage, drive mechanism, gear arrangement, coupling, motor, dwell mechanism, or other type of control mechanism associated with the receptacle 12 that will control the movement or rotation of the discharge member 32. Those of ordinary skill in the art will also appreciate that discharging the articles from the interior space 28 may be accomplished in many ways. For instance, the discharge opening 30 may be disposed within one of the side walls 34 or end walls 36 and controlled by a discharge member 32 that either slides or otherwise moves from the closed/retracted position to the open discharge position. Of course, the location of the discharge member 32 is preferably approximate the location of the discharge opening 30 and vice versa.

The Order Start Station

Figure 6:
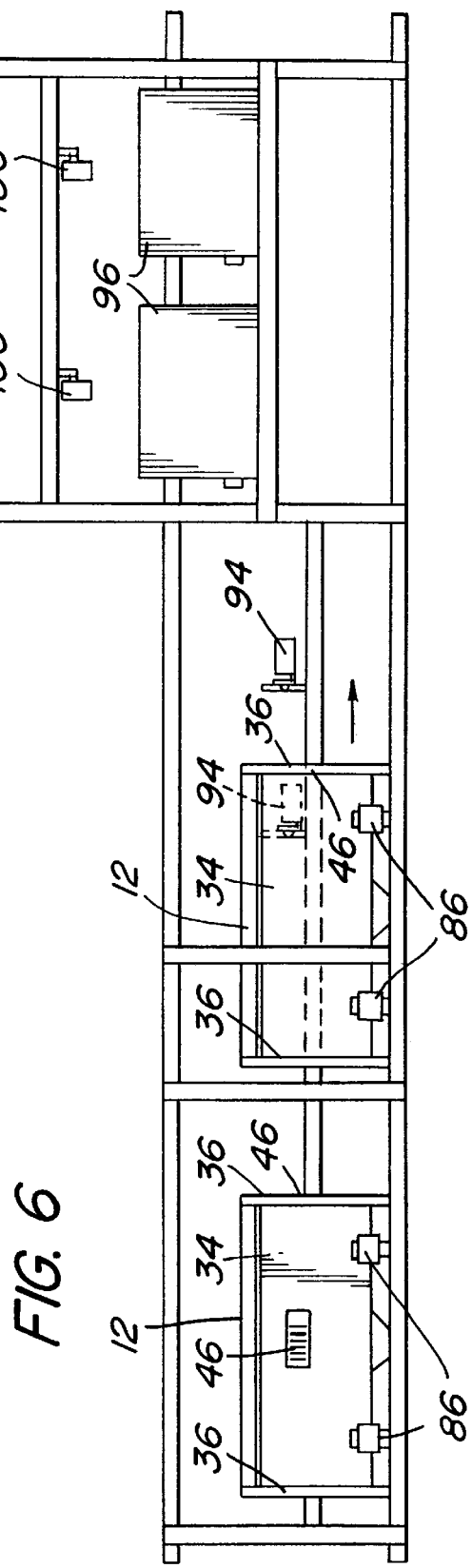
FIG. 6 is a side view, greatly simplified, of an order start station of the system according to the invention, relative to two receptacles.

As illustrated in FIG. 6, the first station along the direction of movement of the conveyor system 14 is at the start of the system 10, which may be referred to as the "order start station". Receptacles 12 (two shown) are moving from left to right approaching a sensor 94. The sensor 94 is provided at the entry of the order start station to identify each receptacle 12 that passes.

The sensor 94 includes a scanner having a bar code reader to scan the indicia 46 on the receptacle 12, which are preferably, but not necessarily, a bar code. By scanning the indicia 46, sensor 94 will determine if the receptacle 12 is available or was previously assigned to carry articles associated with a preselected customer order. If the receptacle 12 was previously assigned, the sensor 94 will generate a "no read" signal. The no read signal is used by the system controller 18 to indicate that the receptacle 12 is being recirculated in the system 10. If, however, the receptacle 12 was not assigned to a preselected customer order, the sensor 94 will transmit a status signal to the system controller 18 indicating that the receptacle 12 is available to be assigned to a new customer order. Thereafter, the receptacle 12 is conveyed by the conveyor system 14 to an inserter 96.

Figure 7:
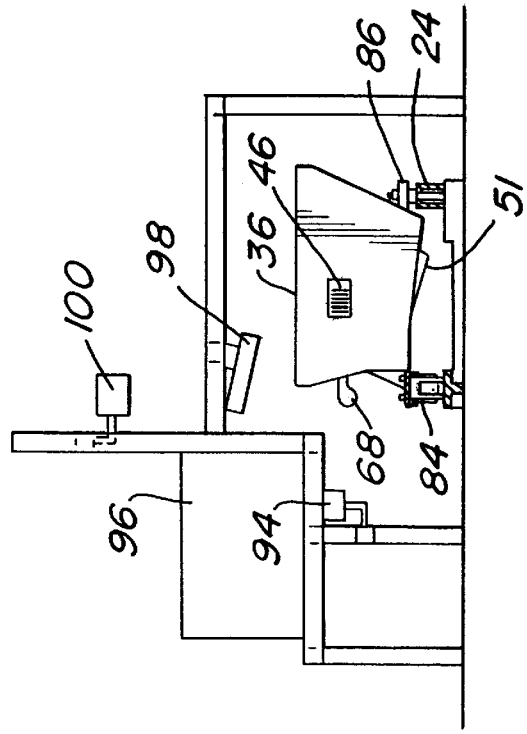
FIG. 7 is a rear view, greatly simplified, of an inserter associated with the order start station shown in FIG. 6, relative to a passing receptacle.

As shown in FIGS. 6 and 7, inserters 96 (two shown) are provided at the order start station. Inserters 96 are positioned downstream from sensor 94 to assign each passing receptacle 12 to a new customer order. As shown in the side view of one of the inserters 96 of FIG. 7, the receptacle 12 passing underneath the inserter 96 is moving into the plane of the paper. The inserter 96 includes a device or other mechanical means to insert an order identification item 98 into each receptacle 12. The order identification item 98 contains information associated with a preselected customer order such as the name and address of the customer, the articles to be selected, the final destination of the order or the like. Stacks of order identification items 98 are stored in the inserter 96, one on top of or behind the other, so that the order identification item 98 may be inserted one at a time. In the preferred embodiment, the order identification item 98 is a folded dispatch note having bar coded indicia that identify the articles associated with the order.

As an available receptacle 12 approaches the inserter 96, a scanner 100 will read the bar coded indicia of the order identification item 98. The scanner 100 is positioned above the passing receptacle 12. The scanner 100 also includes a processor that will associate or "logically marry" the information represented by both the order identification item 98 and the indicia 46 to create an order signal that is relayed to the system controller 18 for downstream use. After the order identification item 98 is read, the system controller 18 will track the location of the receptacle 12 within the conveyor system 14 and generate a signal to instruct the inserter 96 to place or insert the order identification item 98 into the passing receptacle 12.

In use, each time the indicia 46 are scanned, the information represented by the order identification item 98 or the order signal is automatically downloaded or becomes accessible. Downloading the information represented by the order identification item 98 will help to identify information relating to the details of the customer's order such as the articles to be placed into the particular receptacle 12, the customer's name and address, and the like. It should be understood, of course, that the inserter 96 may be eliminated and the order identification item 98 may be placed manually into the receptacle 12 after it has been scanned. In all, any number of inserters 96 may be incorporated into the system 10.

The Article Dispensing Station

Figure 8:
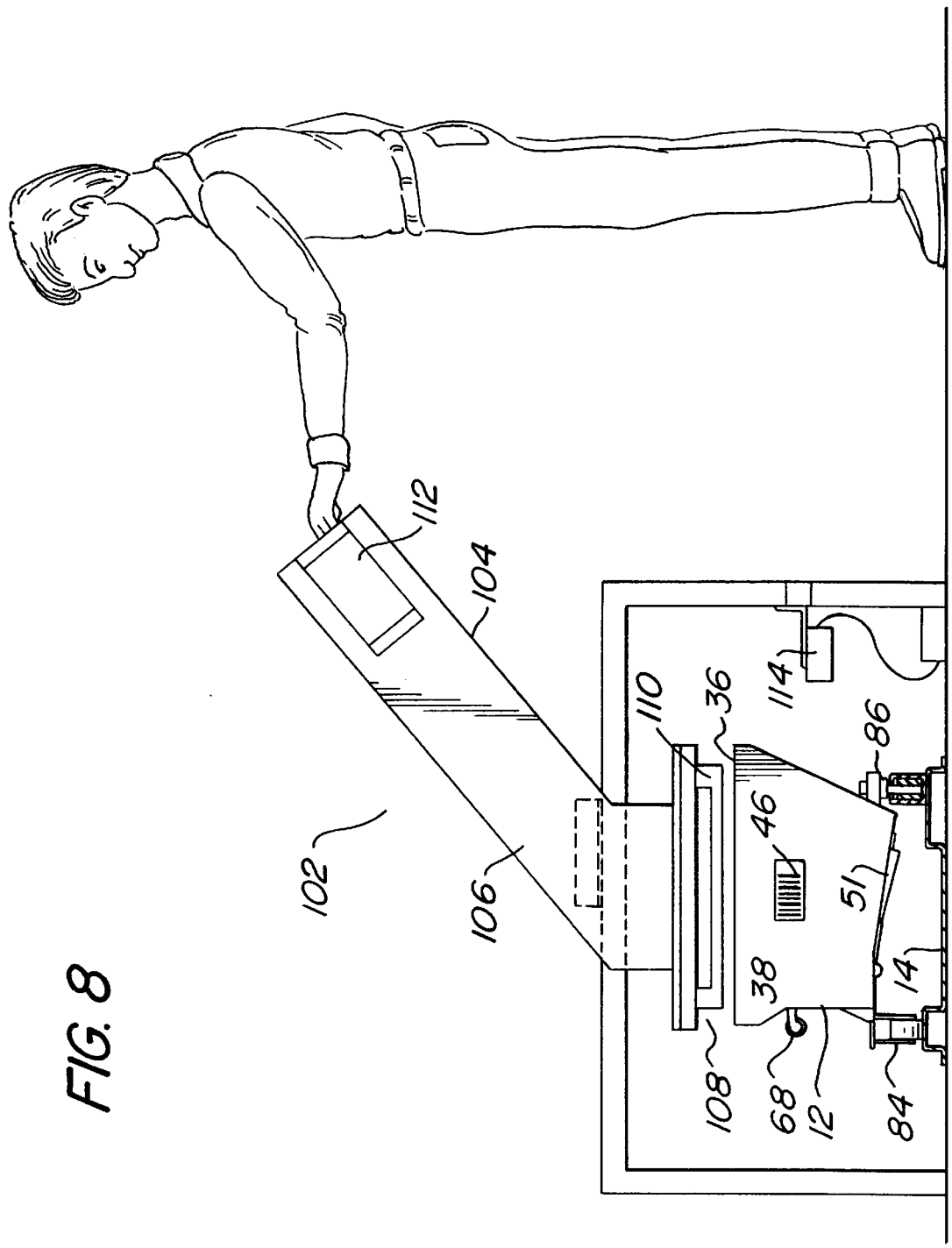
FIG. 8 is a rear view, greatly simplified, of an article dispensing station of the system according to the invention shown relative to a passing receptacle and an operator (provided for illustration purposes only).

At least one article dispensing station 102 is positioned downstream from the order start station to selectively dispense one or more of the articles associated with the customer order (as represented by the order identification item 98 or order signal) into one or more receptacles 12. FIG. 8 illustrates an exemplary article dispensing station 102, it being understood that a plurality of article dispensing stations may be used.

As shown in FIG. 8, the article dispensing station may be operated manually by an operator shown standing, facing toward the left. As shown, the article dispensing station 102 comprises a dispenser 104 associated with a stacking device (not shown) that stores one or more articles in discrete stacks. The dispenser 104 includes a chute 106 through which articles fall downwardly toward a discharge end 108 that is situated over the conveyor system 14. The conveyor system 14 will deliver the receptacle 12 to a location directly under the discharge end 108, so that articles will fall directly into the receptacle 12.

The discharge of articles through the discharge end 108 is controlled by a door assembly 110. The door assembly 110 includes a gate or other similar structure that is mounted to swing or slide open to clear the discharge end 108. The opening and closing of the gate is controlled by an operation box 112 that is, in turn, controlled by the operator.

A sensor 114 is positioned at the entry point of the article dispensing station to identify each receptacle 12 that passes. The sensor 114 includes a scanner having a bar code reader to scan the indicia 46 to identify the articles to be placed into the receptacle 12 and to generate a tracking signal based upon the location of the receptacle 12. The tracking signal is relayed to the system controller 18 to record the location of the receptacle 12 on the conveyor system 14. Based upon the location of the receptacle 12 as represented by the tracking signal, the system controller 18 will generate a display signal that is received by the operation box 112. Once the signal is received, the operator may selectively discharge one or more articles into the receptacle 12.

In an alternative embodiment, the article dispensing station may include a plurality of integrated article dispensers. The integrated dispensers may, but need not, be positioned downstream of the order start station to dispense into the receptacles 12 the articles associated with the preselected customer order. Each integrated dispenser may be positioned above the conveyor system 14 to dispense one or more articles into the receptacles 12.

Associated with each integrated dispenser is a plurality of channels for storing various articles, each channel being associated with at least one article. The integrated dispensers are principally controlled by the system controller 18 that uses the tracking signal generated by the sensor 114 and the information associated with the order identification item 98 to determine the specific type and quantity of articles to be dispensed into the receptacle 12. The system controller 18 will generate a command signal, based upon the location and speed of the receptacle 12, to activate the particular integrated dispenser as the receptacle 12 passes. Persons skilled in the art will recognize that the integrated dispensers may be one of several dispensing devices known in the art, such as the automated article dispenser shown in Lindqvist et al. U.S. Pat. No. 5,271,703.

The Pack Stations

Figure 9:
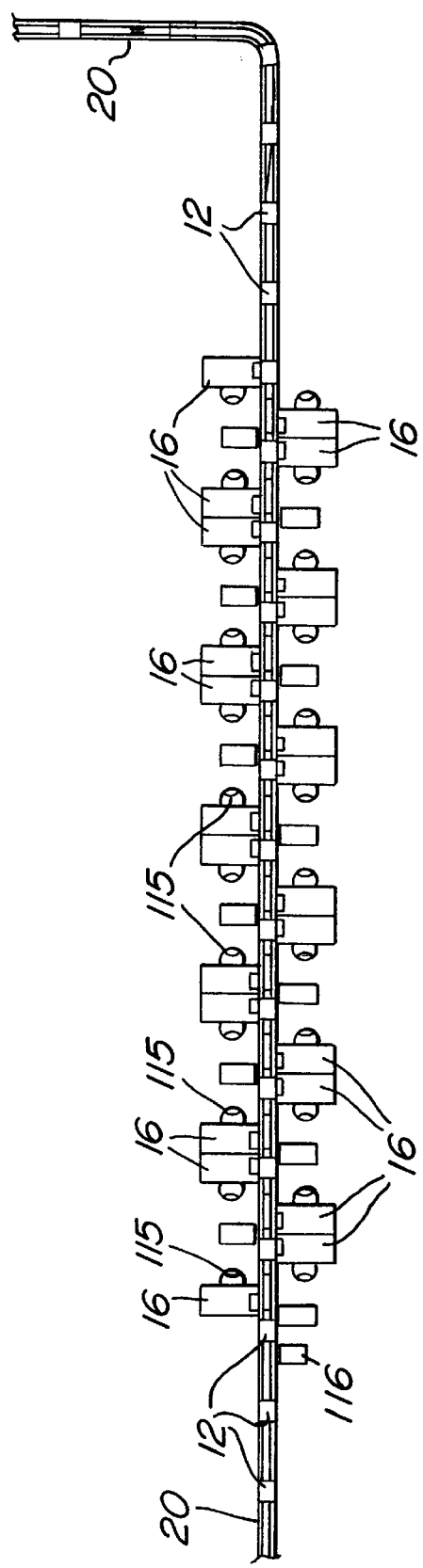
FIG. 9 is a top view, greatly simplified, of a plurality of pack stations of the system according to the invention, each pack station arranged along a direction of movement of a conveyor system.

After leaving the article dispensing station, the conveyor system 14 transports each of the receptacles 12 downstream toward the pack stations 16. As shown in FIG. 9, the pack stations 16 are arranged along the direction of movement of the conveyor system 14. The pack stations 16 may be arranged on both sides of the conveyor, either adjacent to or remote from one another. The figures 115 adjacent each of the pack stations 16 represent an operator, which has been provided for illustration purposes only. In the preferred embodiment, each pack station 16 will be assigned an identification number or other form of identification means associated with the particular packing attributes of the pack station 16. The identification means are stored by the system controller 18 for use.

A sensor 116 is provided near the entry point of the pack stations 16. The sensor 116 includes a scanner having a bar code reader positioned to scan the indicia 46 of the receptacle 12. The scanner will generate a tracking signal representative of the location of the receptacle 12 on the conveyor system 14. The tracking signal is relayed to the system controller 18 to identify the location of the receptacle 12 and to download the information represented by the order identification item 98. For instance, the system controller 18 will download the type of articles dispensed into the receptacle 12 and the mailing address of the customer. Based upon the information that is downloaded, the system controller 18 will assign the receptacles 12 in round-robin fashion to one of the pack stations 16 that has packing attributes (discussed below) that match the information associated with the order identification item 98, such as the final destination of the customer's order.

If a pack station 16 having the appropriate packing attributes is not available, the system controller 18 will look for the next available pack station 16 with the appropriate packing attributes. If none are available, the receptacle 12 is recirculated through the system 10 until an appropriate pack station 16 becomes available.

Figure 10:
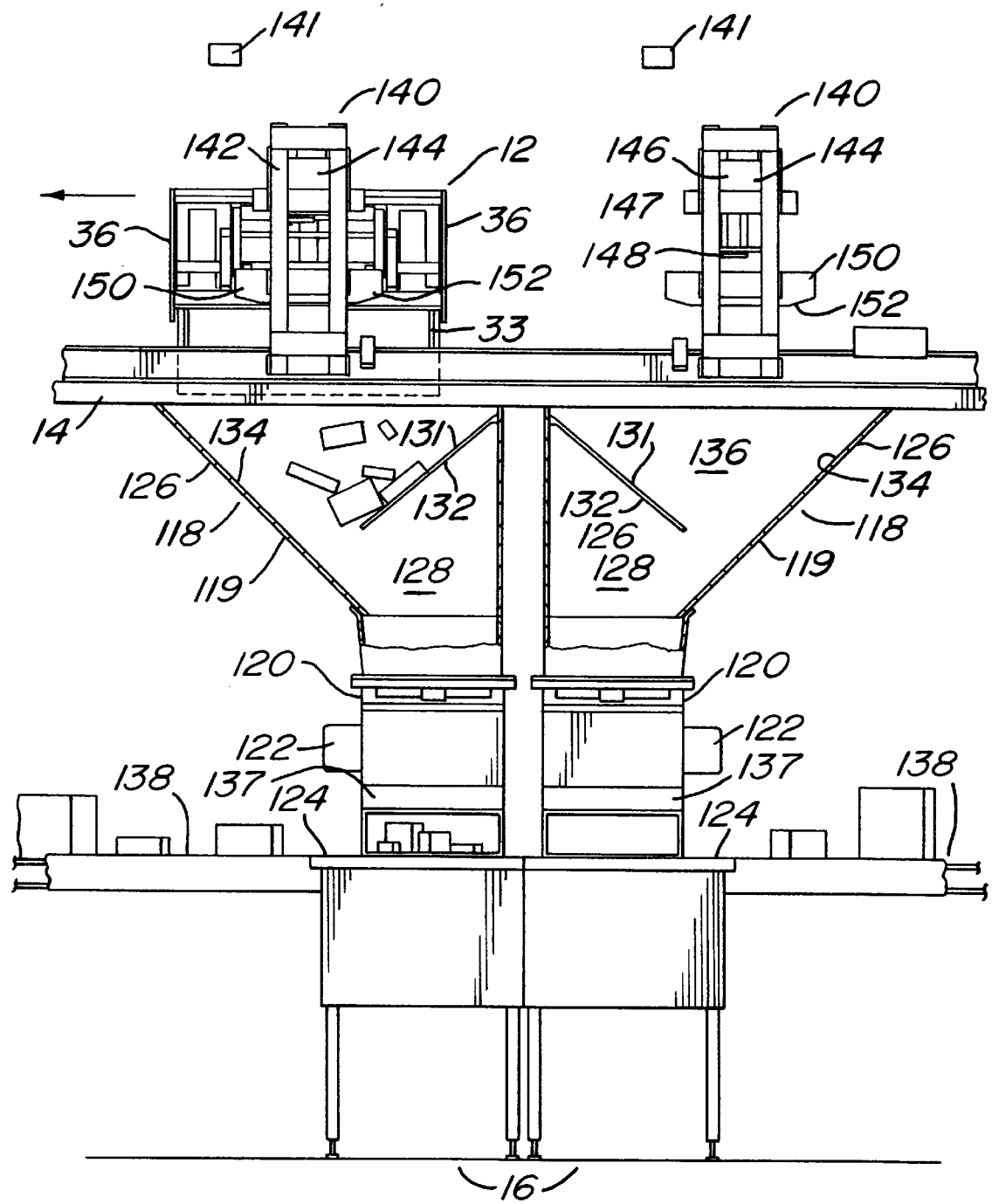
FIG. 10 is a side view, greatly simplified, of the major parts of two adjacent pack stations of the system according to the invention, having a portion of each pack station shown in section.

FIG. 10 shows a pair of exemplary pack stations 16 arranged side by side, each positioned underneath a portion of the conveyor system 14. The conveyor system 14 as shown is situated above the pack stations 16, supported by beams or other vertical support members. The conveyor system 14 is elevated to release the retractable door 33 so that it may rotate from the retracted/closed position to the discharge/open position as discussed above.

Each pack station 16 comprises an article receptacle 118, a discharge end 120, an operation box 122, and a table 124. The article receptacle 118, hereinafter referred to as a hopper, is provided to receive and temporarily store articles discharged from the receptacle 12. The hopper 118 includes an open top that is positioned directly underneath the conveyor system 14, straddling between the rail 22 and chain conveyor 24. The hopper 118 is formed by a plurality of walls 126 joined to each other to form an interior space 128 for receiving the articles discharged from the receptacle 12. The walls 126 are preferably shaped in the form of a funnel having one side 119 disposed at an angle.

In the preferred embodiment, a baffle assembly 130 is provided in the interior space 128 of the hopper 118 to receive and cushion the impact of the articles that are discharged. The baffle assembly 130 includes a first baffle 132 attached to the inner surface of wall 126 that extends downwardly into a portion of the interior space 128. The first baffle 132 has a top surface 131 that faces upward toward the receptacle 12 that passes overhead to receive the articles that are discharged.

The baffle assembly 130 also includes a second baffle 134, positioned below the free end of the first baffle 132. As shown in FIG. 10, the second baffle 134 is approximately perpendicular to the first baffle 132 and further defines at least a portion of side 119 of wall 126. The position of the first baffle 132 and the second baffle 134 form a receiving area 136 within the interior space 128 of the hopper 118.

Preferably, the second baffle 134 includes a flexible element which cushions the fall of the articles that either hit it directly or are deflected from the first baffle 132. In the preferred embodiment, the flexible element includes fabric under tension or some other type of resilient material, such as rubber, soft plastic, foam, or the like, that will absorb the impact of the articles. Articles discharged from the receptacle 12 may fall onto the first baffle 132, slide down its top surface 131, and fall onto the second baffle 134. Thereafter, the articles will fall downwardly to the discharge end 120.

The discharge end 120 releasably retains the articles that fall into the lower portion of the hopper 118. The discharge end 120 is positioned at the bottom of the hopper 118 and has a discharge opening (not shown) controlled by a gate (also not shown). The gate is adapted to swing or slide open to clear the discharge opening so that the articles may be released. The discharge opening is in communication with a slide 137 that channels the articles onto the table 124 for packing by the operator.

The discharge end 120 is controlled by an operator through the operation box 122. The operation box 122 includes a switch, such as a push button device that, in the preferred embodiment, transmits an electric signal that causes the gate to swing into the open position, thereby allowing the articles to be discharged through the discharge opening. Pushing the button also generates a signal that is sensed by the system controller 18. The system controller 18 will rely upon the signal in part to record that the particular pack station 16 is available to receive articles from another receptacle 12. In an alternative embodiment, a photo eye may be used to verify that the interior space 128 of the hopper 118 is empty.

Each pack station 16 will be uniquely identified in the system 10 by its packing attributes. The packing attributes of a particular pack station 16 include information such as the type of order that may be handled by the pack station 16. The packing attributes of each pack station 16 are stored by the system controller 18. Accordingly, the system controller 18 may be used to change the particular packing attributes of a pack station 16. In that way, the system controller 18 may be used to designate one or more pack stations to handle similar orders.

In an alternative embodiment, the operation box 122 may be also used to control the particular packing attributes of a particular pack station 16. In this type of embodiment, the operation box 122 may include one or more settings that correspond to a particular packing attribute. A switch may be used to select a particular setting. Once a setting is selected, the switch will generate a setting signal that is sensed by the system controller 18 in the same way as the push button described above. The setting will be stored by the system controller 18 for use in matching the packing attributes of the pack station 16 with a particular receptacle 12.

Positioned below the conveyor system 14 is a lower conveyor 138, such as a belt conveyor, driven in conventional fashion. The lower conveyor 138 is provided to deliver the packaged articles to a location in preparation for delivery to the customer. The height of the lower conveyor 138 may be commensurate with the height of the table 124. The lower conveyor 118 is optional and may be eliminated, if desired.

Associated with each pack station 16 is a door opening assembly 140 to engage and activate the door operator 52. The door opening assembly 140 is preferably arranged above the pack station 16 and includes a support structure 142 secured along a portion of the conveyor system 14. The support structure 142 supports an actuator 144 for engaging the trip rod 68 of the linkage on the receptacle 12. The actuator 144 is attached to the upper portion of the support structure 142.

Figure 11:
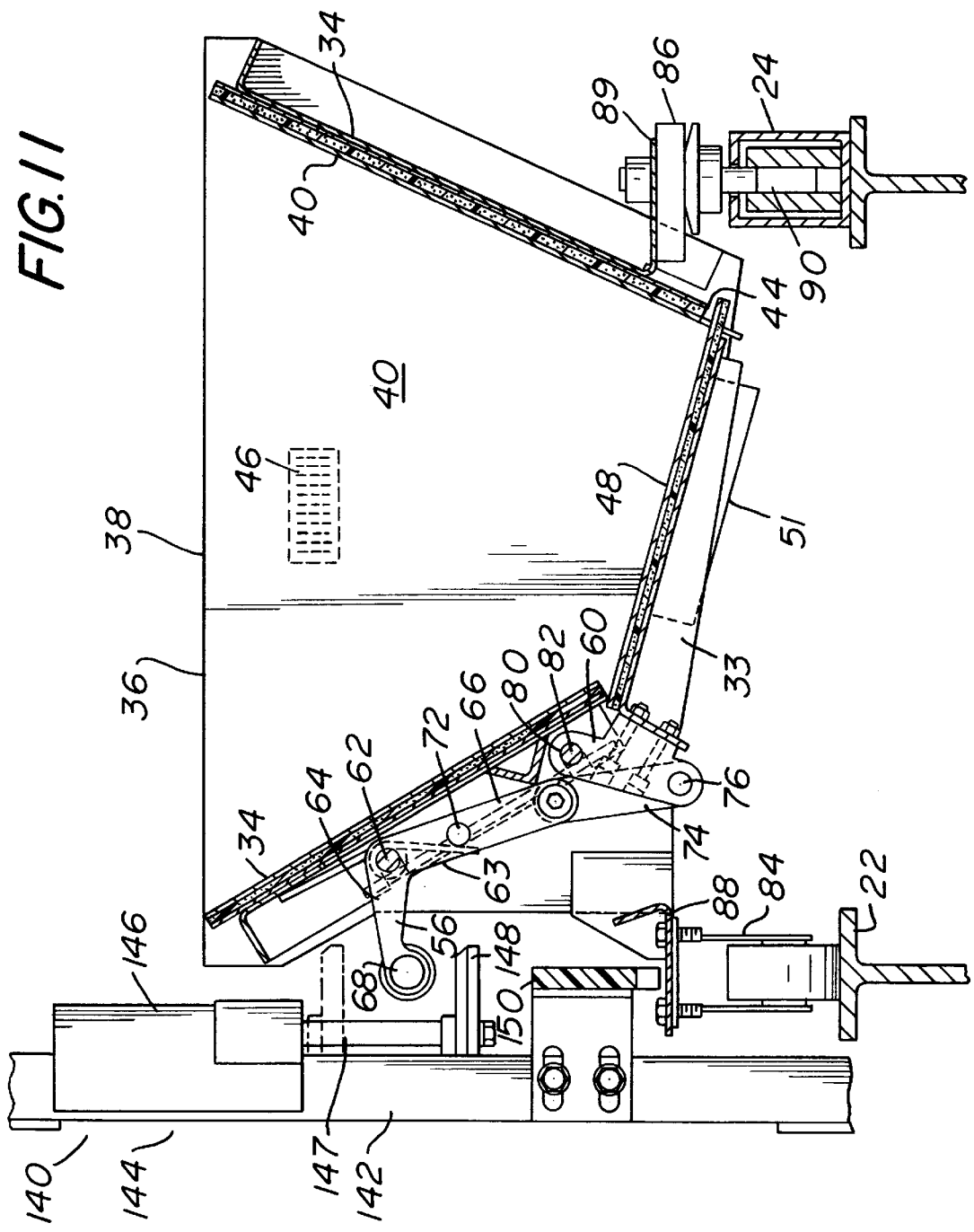
FIG. 11 is an isolated side view of a door opening assembly of the system according to the invention, relative to the receptacle with the discharge member in the closed position as depicted in FIG. 3.

Referring now to FIG. 11, the receptacle 12 is shown moving into the plane of the paper passing the actuator 144. The actuator 144 includes an energy transfer system in the form of a pressure cylinder 146 that is connected to a pressure source (not shown). The cylinder 146 includes a shaft 147 from which a lever or other drive activating element 48 extends from its lower end. The shaft 147 is adapted to move from an extended position (shown in sold lines) to a retracted position (shown in phantom). The lever 148 is adapted to engage the trip rod 68 of the receptacle 12 to activate the door operator 52.

The movement of the shaft 147 is controlled by pressurizing the cylinder 146. The cylinder 146 is pressurized when the pressure source supplies fluid such as a liquid or gas that flows under pressure to one end of the cylinder 146. As the cylinder 146 is being pressurized, the shaft 147 will move upwardly to the retracted position, taking with it the lever 148. As the lever 148 moves upwardly it will engage the trip rod 68 of the door operator 52, lifting it upwardly toward the top of the receptacle 12. As the trip rod 68 is moved upwardly, the drive assembly will cause the retractable door 33 to rotate downward to the open position. After the receptacle 12 clears the door opening assembly 140, the shaft 147 may be returned to the extended position by pressurizing an opposite end of the cylinder 146.

The timing and sequence of the operation of the door opening assembly 140 is controlled by the system controller 18. The system controller 18 will generate a signal to activate the actuator 144 when the receptacle 12 is at a predetermined location relative to the pack station 16. The signal is calculated based upon the movement of the receptacle 12 and the distance needed for the receptacle 12 to reach the pack station 16 to which it has been previously assigned.

Those of ordinary skill will appreciate that the control of pressurizing the cylinder 146 may be controlled by various circuits. These circuits may include control valves and similar directional devices to control the rate, pressure, and timing of the fluid that is introduced into the cylinder 146. It should be also understood that the flow rate or pressure of the fluid that is introduced into the cylinder 146 to retract the shaft 147 should be sufficient to move the weight imposed on the lever 148 by the receptacle 12. Depending upon the weight characteristics of the receptacle 12, either pneumatic or hydraulic cylinders may be used.

Other means for actuating the door operator 52 may be used. For example, motors, linkages, gear arrangements, electronic devices, and other mechanisms associated with the receptacle 12 may be used to externally activate the door operator 52. Likewise, the actuating means may be located within or external to the receptacle 12.

A stabilizing member 150, such as a flange, is secured across the support structure 142 below the actuator 144 and lever 148. The stabilizing member 150 includes a bottom edge 152 that will pass in close proximity with the support bracket 88 of a passing receptacle 12. In use, the stabilizing member 150 will prevent the receptacle 12 from titling as the retractable door 33 rotates open.

Figure 12:
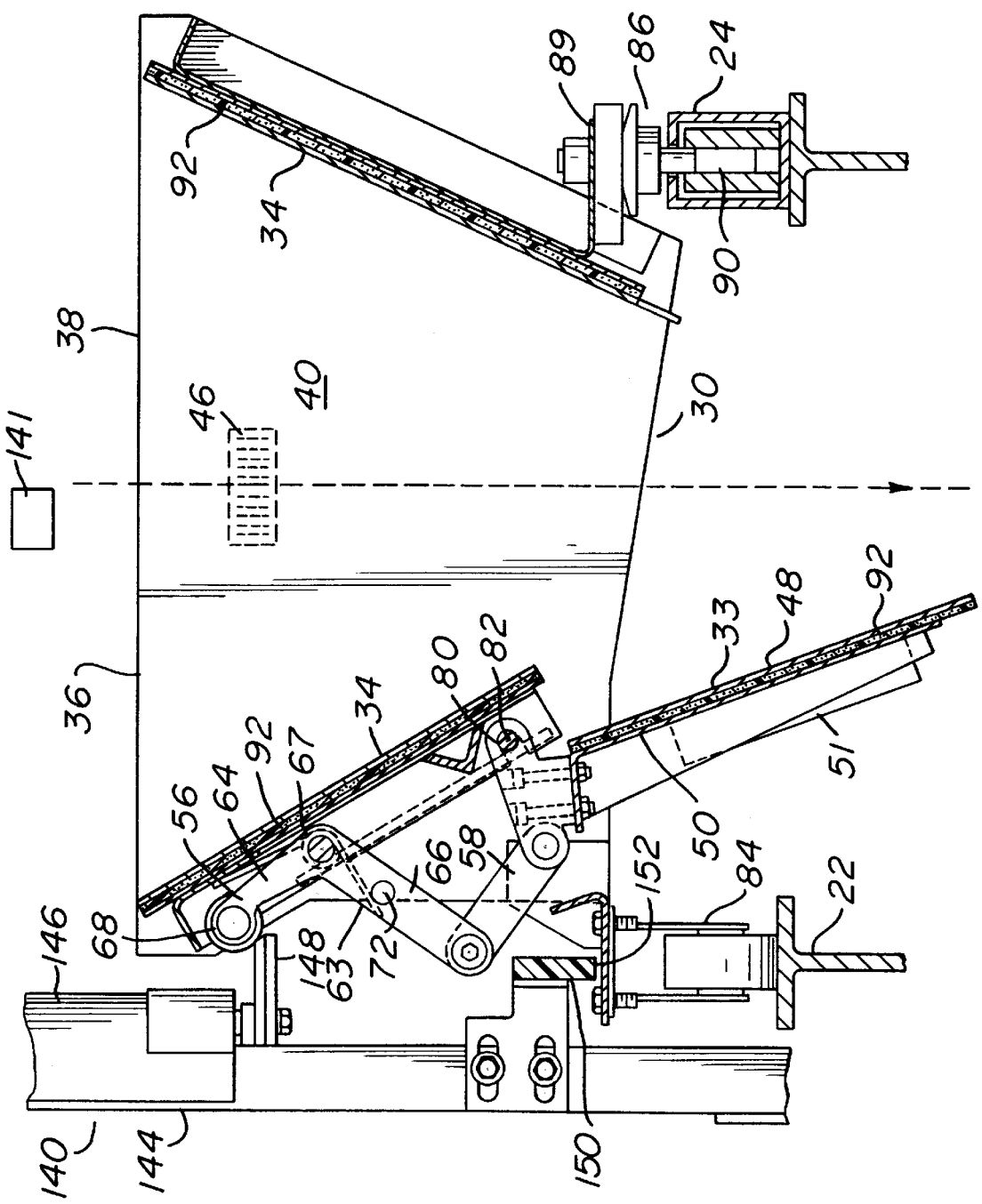
FIG. 12 is an isolated side view of the door opening assembly shown in FIG. 11 after it has engaged the receptacle to move the discharge member to the open position as depicted in FIG. 5.

Turning now to FIG. 12, the receptacle 12 is shown in the open position. The lever 148 has moved the trip rod 68 upwardly and the retractable door 33 has rotated to the open position, as discussed previously. Once in the open position, the articles will fall downwardly through the discharge opening 30 due to gravitational forces into the receiving area 136 of the hopper 118.

Briefly referring back to FIG. 10, the discharge of the articles from the passing receptacle 12 is illustrated in the pack station 16 and door opening assembly 140 to the left. As shown, the articles will fall into the receiving area 136. Some of the articles may fall onto the first baffle 132 and slide downwardly toward side 119 or, in the preferred embodiment, toward the second baffle 134. Thereafter, the articles continue to fall downwardly into the discharge end 120. After the articles have reached the discharge end 120, the operator will activate the gate so that the articles will slide onto the table 124, as described previously.

A photo sensor 141 is associated with each door opening assembly 140. The photo sensor 141 includes a photo eye that looks downwardly into the interior space 28 of each passing receptacle 12. The photo eye will verify that the retractable door 33 has rotated to the open position. If the retractable door 33 has rotated to the open position, the photo sensor 141 will generate and relay a signal to the system controller 18 indicating this condition. If the retractable door 33 did not rotate open, the photo sensor 141 will not generate a signal. Other means for verifying that the retractable door 33 has rotated open may also be used.

After the retractable door 33 is verified open, the system controller 18 will logically separate the information associated with the order identification item 98 and the indicia 46. As a result, the receptacle 12 is then free or available to be assigned to another order.

The Closing Station

Figure 13:
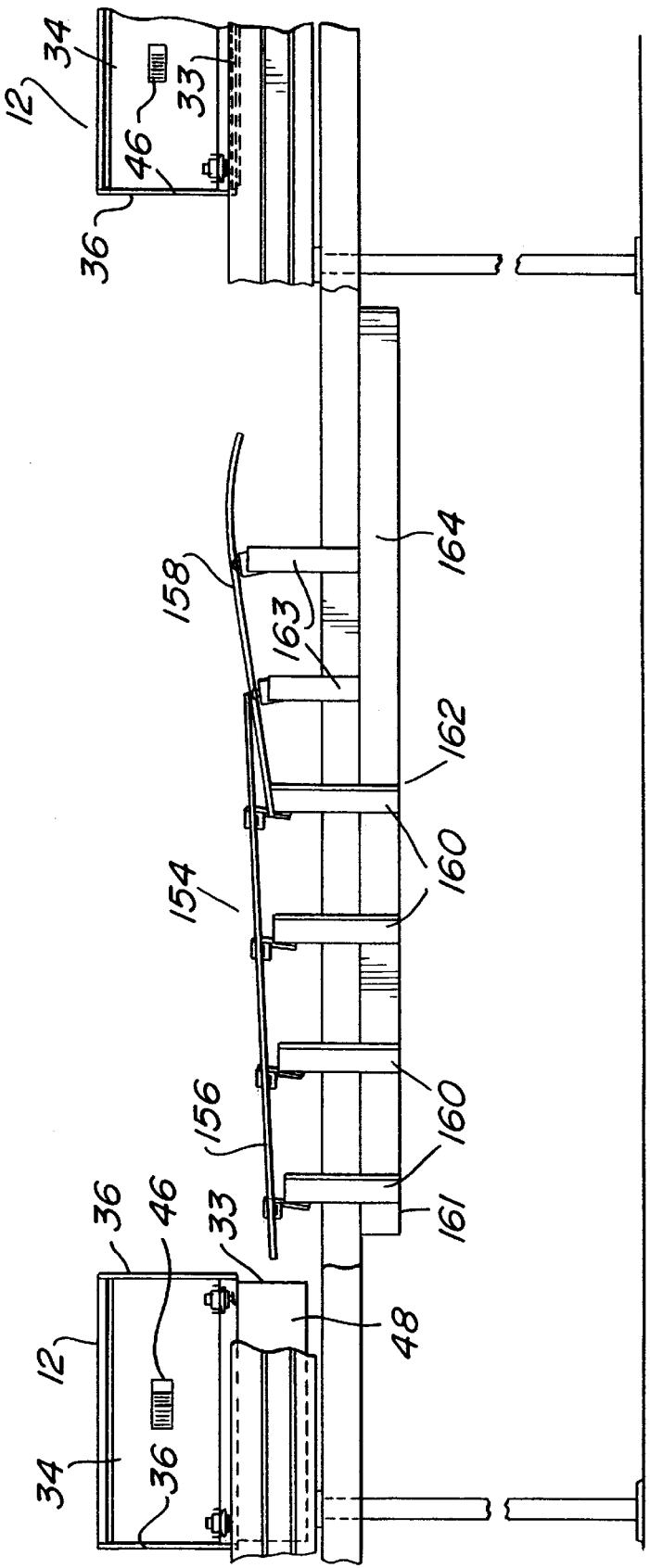
FIG. 13 is a side elevational view, greatly simplified, of the major parts of a closing station of the system according to the invention, relative to two receptacles.

Located at the exit of the pack stations 16 is the closing station. The closing station is provided to return the retractable door 33 of a passing receptacle 12 from the open position to the closed position. Referring to FIG. 13, the closing station has a closing assembly 154 which extends along the direction of movement of the conveyor system 14. The closing assembly 154 includes a first guide rail 156 in spaced relation to a second guide rail 158.

The first guide rail 156 is supported by a plurality of vertical support members 160 situated between rail 22 and the chain conveyor 24. Each vertical support member 160 has a different height, increasing from the lowest end 161 (shown on the left) to the highest end 162 (shown on the right). As a result, the first guide rail 156 is inclined upwardly, rising gradually from the lowest end 161 to the highest end 162.

Figure 14:
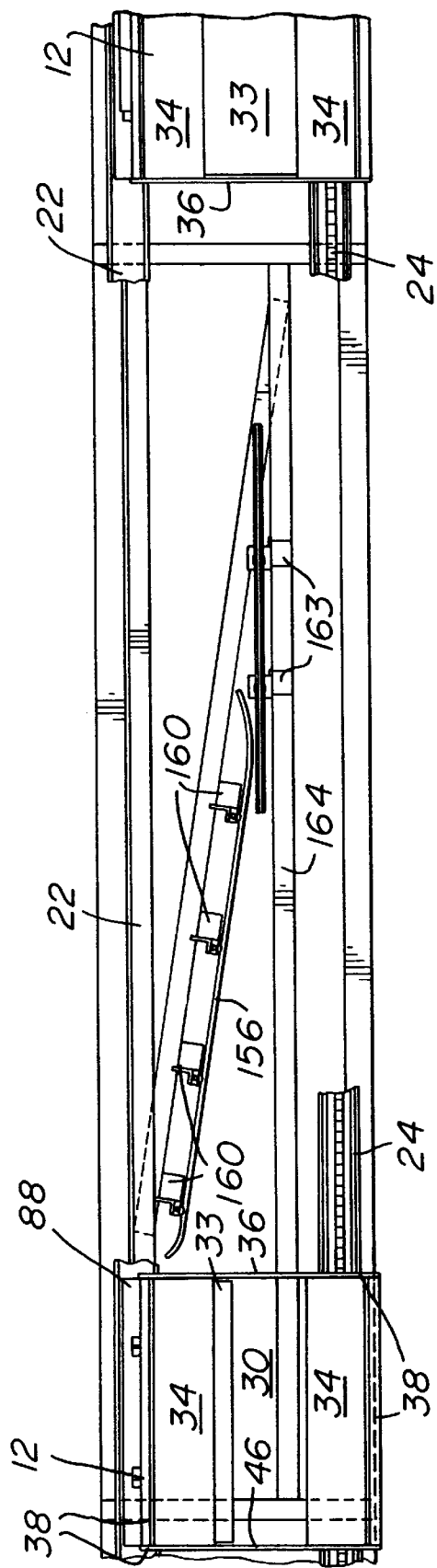
FIG. 14 is a top elevational view of the dosing station shown in FIG. 13.

The second guide rail 158 is mounted on a pair of vertical support members 163 that extend upwardly from a support structure 164 that extends parallel to the chain conveyor 24. The support structure 164 is located about ⅓ of the distance between the chain conveyor 24 and the rail 22 so that the second guide rail 158 is located near the center of the track 20, as best seen in FIG. 14. The second guide rail 158 has a first end that is located slightly below the second end of the first guide rail 156. The second guide rail 158 also rises gradually and terminates in a second end.

As best seen in FIG. 14, the first guide rail 156 extends diagonally across a portion of the track 20, at an angle to it. The second guide rail 158 is aligned parallel to the support structure 164 and has a length slightly shorter than the first guide rail 156. The length of the first guide rail 156 and the second guide rail 158 may vary, depending upon such factors as the size of the retractable door 33, the speed of the conveyor system 14, and other system requirements.

Figure 15:
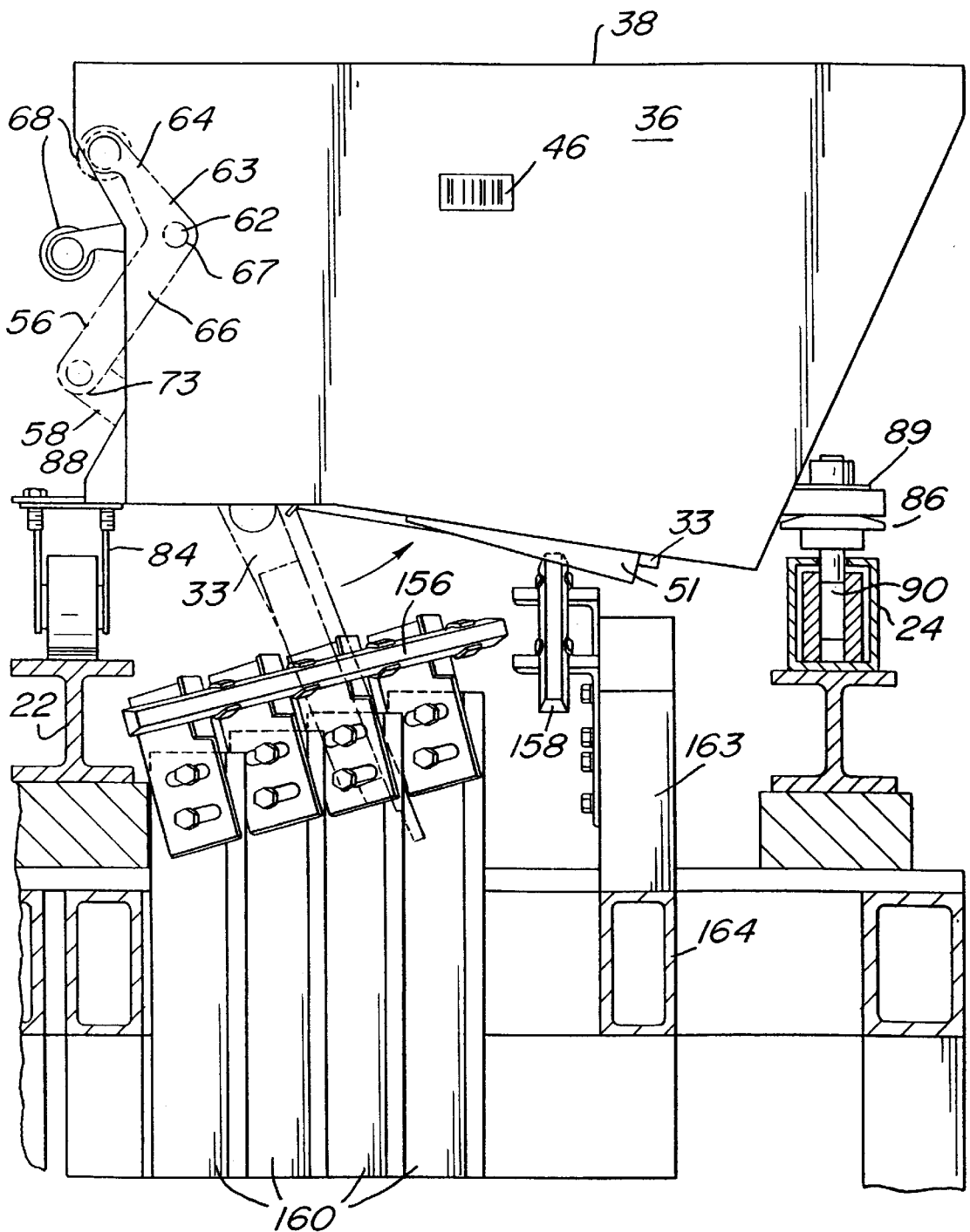
FIG. 15 is a rear elevational view of the receptacle moving through the closing station shown in FIGS. 13 and 14.
Figure 16A:
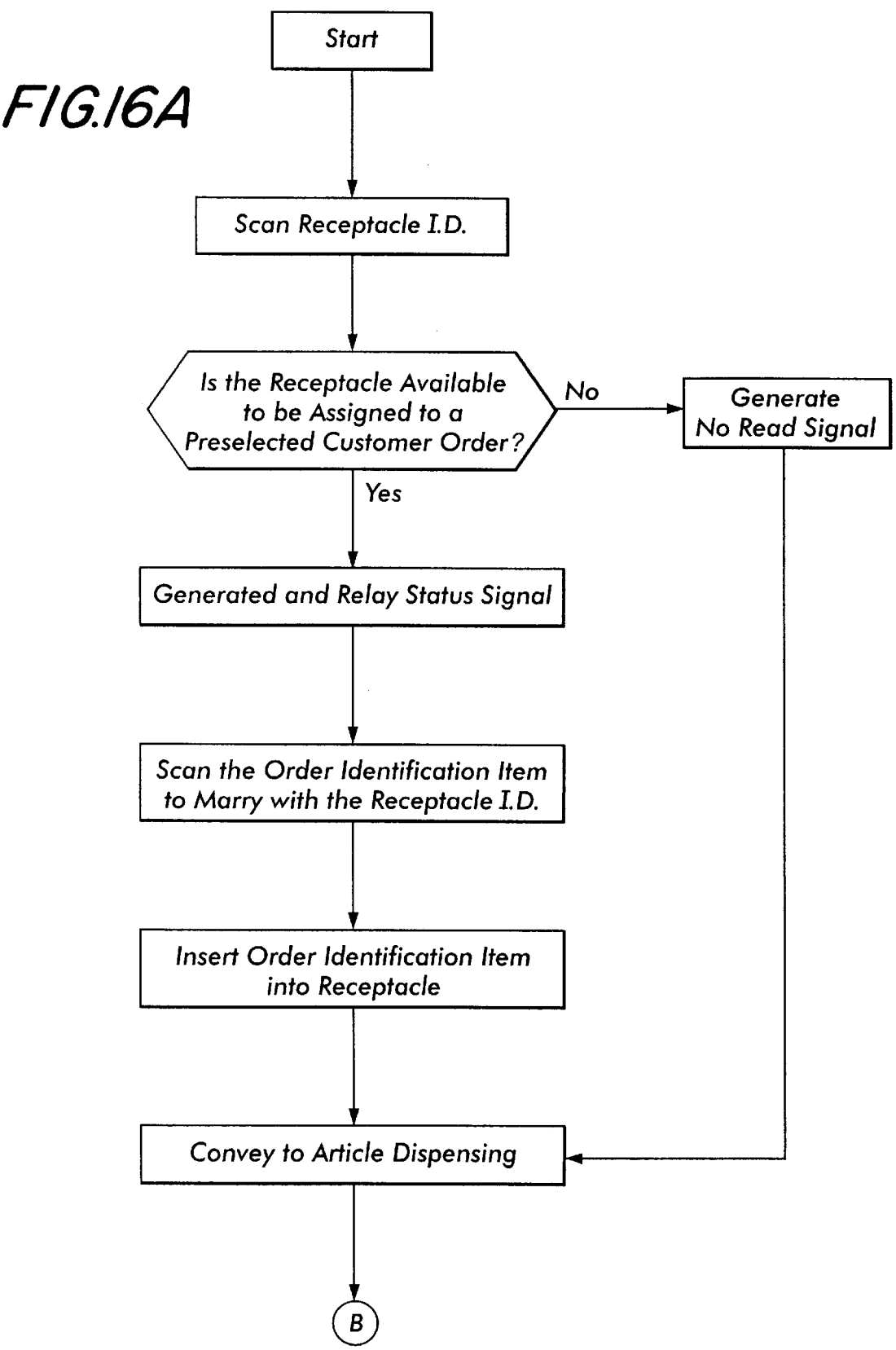
FIG. 16 is composed of parts 16A, 16B, 16C, and 16D, which, in total, comprise a flow chart for the operation of the system according to the invention.

Turning now to FIG. 15, the receptacle 12 is shown relative to the closing station, moving into the plane of the paper toward the closing assembly 154. The receptacle 12 will approach with the retractable door 33 in the open position, shown in phantom in this figure. The trip rod 68 will be in the upward position, also shown in phantom. As the receptacle 12 moves through the closing station, the wear member 51 of the retractable door 33 will frictionally engage and slide along the surface of the first guide rail 156. The movement of the receptacle 12 along the conveyor system 14 toward the second end of guide rail 158 will cause the first guide rail 156 to exert a force on the retractable door 33 such that the retractable door 33 begins to rotate counterclockwise toward the closed position, as illustrated by the directional arrow.

After the retractable door 33 moves upwardly and reaches the second end of the first guide rail 156, it will be transferred to the second guide rail 158. The second guide rail 158 will exert a force on the retractable door 33 in much the same way as the first guide rail 156, sufficient to return it to the fully closed position. The torsion springs 70 will help the retractable floor 33 rotate to the closed position.

It should be understood that the closing assembly can include other means for returning the retractable door 33 to the closed position. For instance, the closing assembly may include a device, such as an actuator, that pushes the trip rod 68 downwardly to close the retractable door 33. The actuator may be similar to the actuator 144 associated with the pack stations 16, however, the lever 148 would be positioned upwardly, near the cylinder 146, in order to receive and push the trip rod 68 downward. In the alternative, the closing station could include a continuous rod or rail that causes the retractable door 33 to be returned to the closed position. The rod may be made of any type of material that will permit the wear member 51 to slide along without impacting the speed of travel of the receptacle 12. In an alternative embodiment, the closing of the retractable floor 33 may be accomplished manually, by a person simply pushing the trip rod 68 downwardly.

FIGS. 16A–16D together comprise a flow chart illustrating various events, processing tasks and decisional choices for one method of operating the present invention. As described in FIG. 16A, the indicia 46 of the receptacle 12 is scanned to determine whether the receptacle 12 is available, or previously assigned to a preselected customer order. If the receptacle 12 has been previously assigned, the system controller 18 generates a no read signal and the receptacle 12 is conveyed to the article dispensing area. If the receptacle 12 has not been previously assigned, the receptacle 12 is conveyed to one of the inserters 96 to be assigned to a preselected customer order. At the inserter 96, the order identification item 98 is scanned and the information associated with it and the indicia 46 of the receptacle 12 is logically married. Thereafter, the system controller 18 generates a signal to instruct the inserter 96 to insert the order identification item into the receptacle 12.

As described in FIG. 16B, the receptacle 12 is conveyed to the article dispensing station. A tracking signal is generated by the sensor 114 based upon the location of the receptacle 12. The tracking signal is relayed to the system controller 18 which records the location of the receptacle 12 and downloads the information associated with the order identification item 98. If articles are to be dispensed into the receptacle 12, the system controller 18 generates a signal that instructs either the operator or the appropriate article dispenser to dispense one or more articles into the receptacle 12 that passes.

As described in FIG. 16C, the receptacle 12 is then conveyed to the pack stations 16. Upon entering the pack stations 16, the indicia 46 of the receptacle 12 is scanned to generate a tracking signal representative of the location of the receptacle 12. The tracking signal is relayed to the system controller 18 to identify the location of the receptacle 12 on the conveyor system 14. The system controller 18 will then download the information associated with the order identification item 98 to assign the receptacle 12 to one of the pack stations 16 having packing attributes that match the information that was downloaded, such as the final destination of the customer's order. If a pack station 16 having the appropriate packing attributes is not available, then the system controller 18 will search for the next available pack station 16 with the appropriate packing attributes. If none are available, the receptacle 12 is sent to the end of the pack stations 16 and recirculated through the system 10. This process is repeated for each receptacle 12 in the system 10, depending upon the number of receptacles 12 used.

If an appropriate pack station 16 is available, the system controller 18 assigns the receptacle 12 to that pack station 16. Next, the system controller 18 generates a signal to instruct the door opening assembly 140 to engage the door operator 52 at the appropriate time, so that the retractable door 33 may rotate to the open position to discharge the articles.

The photo sensor 141 will verify that the retractable door 33 has rotated open. If the retractable door 33 is open, the photo sensor 141 will generate and relay a signal to the system controller 18 indicting this condition. Once the signal is received, the system controller 18 will divorce the information associated with the order identification item 98 from the indicia 46 of the receptacle 12.

As the receptacle 12 exits the pack stations 16, it will be conveyed to the closing station, as described in FIG. 16D. If the receptacle 12 has discharged its articles, the retractable door 33 will be in the open position. The retractable door 33 will be closed by the first guide rail 156 and the second guide rail 158. After the retractable door 33 is closed, the receptacle 12 is recirculated to the order start station.

Persons skilled in the art will recognize that there may be different methods of operation which do not depart from the spirit and scope of the invention as defined in the claims. Also, it should be understood that the drawings, while useful in illustrating the invention, are not intended to necessarily be to scale. The dimensions and relative sizes and locations of the various parts shown can be varied, depending on the particular articles being handled, the number of articles being handled, the space available to house the order selection and distribution system, and the like, without departing from the scope of the invention. To the extent that the drawings imply dimensions and relative size and positions, the drawings should be regarded as illustrative only and not limiting the invention to particular dimensions, sizes and position and location of parts.

The present invention may be embodied in other specific forms without departing from the spirit or essential attributes thereof and, accordingly, reference should be made to the appended claims, rather than to the foregoing specification, as indicating the scope of the invention.

We claim:

1. An order selection and distribution system for selecting and delivering a plurality of articles associated with a preselected order to a packing area, the order selection and distribution system comprising:
   a discrete article receptacle for releasably retaining articles to be delivered, having an interior space for receiving the articles and a discharge opening for discharging the articles,
   a conveyor for transporting the receptacle to predetermined locations within the system,
   an order identification item associated with the receptacle to assign the receptacle to carry specified articles associated with a preselected order,
   a pack station arranged along a direction of movement of the conveyor for receiving the articles to be discharged from the receptacle,
   an actuator associated with the pack station for selectably engaging the receptacle to cause the articles in the interior space to be discharged through the discharge opening, and
   a system controller for tracking the location of the receptacle in the system and for generating a discharge signal to cause the actuator to engage the receptacle when the receptacle is at a predetermined discharge location in the system, relative to the pack station.

2. The order selection and distribution system as claimed in claim 1, comprising a plurality of discrete article receptacles, each receptacle including
   an open top,
   a wall defining a portion of the interior space,
   a discharge member operatively attached to the receptacle for controlling the discharge of the articles through the discharge opening, the discharge member being adapted to move between a retracted position and a discharge position, and
   a door operator connected to the discharge member to control the movement of the discharge member from the retracted position to the discharge position.

3. The order selection and distribution system as claimed in claim 2, wherein each receptacle includes indicia attached to the wall for uniquely identifying the receptacle.

4. The order selection and distribution system as claimed in claim 3, wherein the discharge opening is a hole at a lower end of the receptacle.

5. The order selection and distribution system as claimed in claim 2, wherein the door operator includes a linkage to control the movement of the discharge member.

6. The order selection and distribution system as claimed in claim 5, wherein the linkage includes an input link pivotably attached to the receptacle and rotatably coupled to an output link releasably secured to the discharge member, wherein the rotation of the input link causes the discharge member to move from the retracted position to the discharge position.

7. The order selection and distribution system as claimed in claim 6, wherein the actuator further comprises a lever to engage and cause the rotation of the input link of the linkage.

8. The order selection and distribution system as claimed in claim 7, wherein the discharge member is a floor pivotably attached to the bottom of the receptacle.

9. The order selection and distribution system as claimed in claim 2, further comprising at least one article dispenser for selectably dispensing into each receptacle one or more articles associated with the preselected order.

10. The order selection and distribution system as claimed in claim 2, wherein the pack station has an interior space for receiving articles discharged from the receptacle.

11. The order selection and distribution system as claimed in claim 2, further comprising an inserter for inserting at least one order identification item into each receptacle, the inserter comprising
    a sensor for reading the indicia on each passing receptacle, and
    a processor to generate downloadable data based upon the information represented by the order identification item and the indicia of a particular receptacle.

12. The order selection and distribution system as claimed in claim 11, further comprising a plurality of pack stations, each pack station having an interior space for receiving the articles discharged from the receptacle.

13. The order selection and distribution system as claimed in claim 12, wherein the system controller assigns each receptacle to at least one pack station.

14. The order selection and distribution system as claimed in claim 13, wherein each pack station has predetermined packing attributes that are stored by the system controller.

15. The order selection and distribution system as claimed in claim 14, wherein the system controller assigns each receptacle to one of the pack stations having packing attributes that match the downloadable data generated by the processor.

16. The order selection and distribution system as claimed in claim 2, further comprising a plurality of order identification items, each order identification item specifying the articles associated with the preselected customer order.

17. The order selection and distribution system as claimed in claim 16, wherein at least one receptacle is assigned to receive articles associated with at least one order identification item.

18. The order selection and distribution system as claimed in claim 16, wherein at least two receptacles are assigned to receive articles associated with one order identification item.

19. An order selection and distribution system for selecting and delivering a plurality of articles associated with a preselected customer order to a predetermined location for packing, the order selection and distribution system comprising:
- (a) a series of containers for releasably retaining the articles to be delivered, each container having
  - i) an open top,
  - ii) a wall having a peripheral edge that defines a portion of an interior space of the container,
  - iii) indicia for uniquely identifying the container,
  - iv) a door movably attached to the wall to support the articles in the interior space,
  - v) a discharge opening for discharging the articles, the discharge opening being controlled by the door, and
  - vi) a drive mechanism for controlling the movement of the door from a closed position to an open position at a predetermined location in the system,
- (b) a conveyor for transporting each container through the system,
- (c) a plurality of pack stations arranged along the direction of movement of the conveyor, each pack station being adapted to receive articles discharged from one or more of the containers,
- (d) a door opening assembly associated with each pack station for selectably engaging the drive mechanism of the containers to cause the door to move to the open position to discharge the articles through the discharge opening,
- (e) a door closing assembly for returning the door to the closed position after the articles have been discharged, and
- (f) a system controller for tracking the location of the containers in the system and for generating a discharge signal to cause the door opening assembly to engage the drive mechanism when a container is at a predetermined discharge location in the system.

20. The order selection and distribution system as claimed in claim 19, further comprising a plurality of sensors for reading the indicia of each container, each sensor being positioned along the direction of movement of the conveyor to identify the location of each container.

21. The order selection and distribution system as claimed in claim 20, further comprising:
- (a) an inserter for inserting an order identification item into each container to assign the container to a preselected customer order, the order identification item having indicia specifying the articles associated with the preselected customer order and the packing requirements of the order, and
- (b) a plurality of article dispensers arranged along the direction of movement of the conveyor, each article dispenser having a device to selectively dispense one or more articles into one or more of the containers based upon the articles identified in the order identification item.

22. The order selection and distribution system as claimed in claim 21, further comprising a sensor for reading the indicia on each container and for reading the indicia associated with the order identification item, the sensor having a processor to generate an order signal based upon the information associated with the indicia on the container and the order identification item.

23. The order selection and distribution system as claimed in claim 22, wherein the system controller downloads the order signal to generate a signal to instruct the article dispensers to dispense one or more articles into at least one of the containers.

24. The order selection and distribution system as claimed in claim 23, wherein each pack station has packing attributes that are unique to it.

25. The order selection and distribution system as claimed in claim 24, wherein the system controller assigns, in round-robin fashion, at least one container to one of the pack stations having packing attributes commensurate with information represented by the order signal.

26. A method of selecting and distributing a plurality of articles associated with a preselected customer order in an order selection and distribution system, the method comprising the steps of:
- providing a plurality of containers for containing the articles associated with the preselected order, each container having an identification means,
- conveying the containers to a preselected location,
- determining if each container has been previously assigned to an order,
- placing an order identification item into each container not previously assigned to an order, the order identification item specifying the articles associated with the preselected order,
- associating the order identification item with the identification means of the container,
- dispersing into the container the articles specified in the order identification item,
- conveying each container to a plurality of pack stations,
- assigning each container to at least one of the pack stations based the information represented by the order identification item,
- releasing the contents of each container into one of the pack stations, and
- recirculating the container through the system.

* * * * *